(12) United States Patent
Faulkner

(10) Patent No.: US 10,547,654 B2
(45) Date of Patent: Jan. 28, 2020

(54) CONCURRENT ENGAGEMENT WITH LIVE CONTENT OF MULTIPLE CONFERENCE SESSIONS

(71) Applicant: Microsoft Technology Licensing, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 15/596,688

(22) Filed: May 16, 2017

(65) Prior Publication Data

US 2018/0337968 A1 Nov. 22, 2018

(51) Int. Cl.
*G06F 15/16* (2006.01)
*H04L 29/06* (2006.01)
*H04L 12/18* (2006.01)

(52) U.S. Cl.
CPC ...... *H04L 65/4015* (2013.01); *H04L 12/1813* (2013.01); *G06F 2203/04803* (2013.01)

(58) Field of Classification Search
CPC ............. H04L 65/4015; H04L 12/1813; G06F 2203/04803
See application file for complete search history.

(56) References Cited

U.S. PATENT DOCUMENTS

| | | | |
|---|---|---|---|
| 6,957,395 B1 | 10/2005 | Jobs et al. | |
| 7,047,177 B1 * | 5/2006 | Lee | H04L 41/0823 703/22 |
| 7,734,692 B1 | 6/2010 | Kaplan et al. | |
| 8,068,595 B2 | 11/2011 | Odinak et al. | |
| 2006/0184886 A1 | 8/2006 | Chung et al. | |
| 2008/0118051 A1 * | 5/2008 | Odinak | H04W 4/12 379/265.09 |
| 2009/0327425 A1 | 12/2009 | Gudipaty | |

(Continued)

OTHER PUBLICATIONS

Shum, et al., "Memetic: An Infrastructure for Meeting Memory", In Technical Report KMI-06-02, Jan. 2006, 15 pages.

(Continued)

*Primary Examiner* — Sm A Rahman
(74) *Attorney, Agent, or Firm* — Newport IP, LLC; Tim R. Wyckoff; Jacob P. Rohwer

(57) ABSTRACT

Described herein are techniques to enable a user to concurrently engage with live content and/or chat conversations of multiple conference sessions at the same time. The concurrent engagement is enabled within a single user interface. The user interface is configured to enable the concurrent engagement with live content and/or chat conversations of multiple conference sessions via an adjacent view (e.g., side-by-side, top and bottom, etc.) or a tabbed view. The live content can be configured for display in a first display region of the user interface. The chat conversations can be configured for display in a second display region of the user interface that is adjacent to the first display region. Consequently, a user is able to manage levels of engagement with live content and chat conversations of multiple conference sessions, and switch the levels of engagement to view and/or hear activity amongst the multiple conference sessions.

19 Claims, 15 Drawing Sheets

(56) References Cited

U.S. PATENT DOCUMENTS

2012/0137231 A1* 5/2012 Maxfield ............. G06F 3/04883
                                                  715/753
2014/0028789 A1   1/2014 Bentley et al.
2014/0317508 A1  10/2014 Wolzien
2015/0207827 A1   7/2015 Jheng et al.
2016/0308920 A1* 10/2016 Brunsch ................ H04L 65/403

OTHER PUBLICATIONS

"Announcing Amazon Chime: Frustration-free online meetings with exceptional audio and video quality", https://aws.amazon.com/about-aws/whats-new/2017/02/announcing-amazon-chime-frustration-free-online-meetings-with-exceptional-audio-and-video-quality/, Published on: Feb. 13, 2017, 3 pages.

Khoury, Rita El, "Google Duo review: When video calls are this simple, I will surely use them more", http://www.androidpolice.com/2016/08/18/google-duo-review-video-calls-simple-will-surely-use/, Published on: Aug. 18, 2016, 15 pages.

* cited by examiner

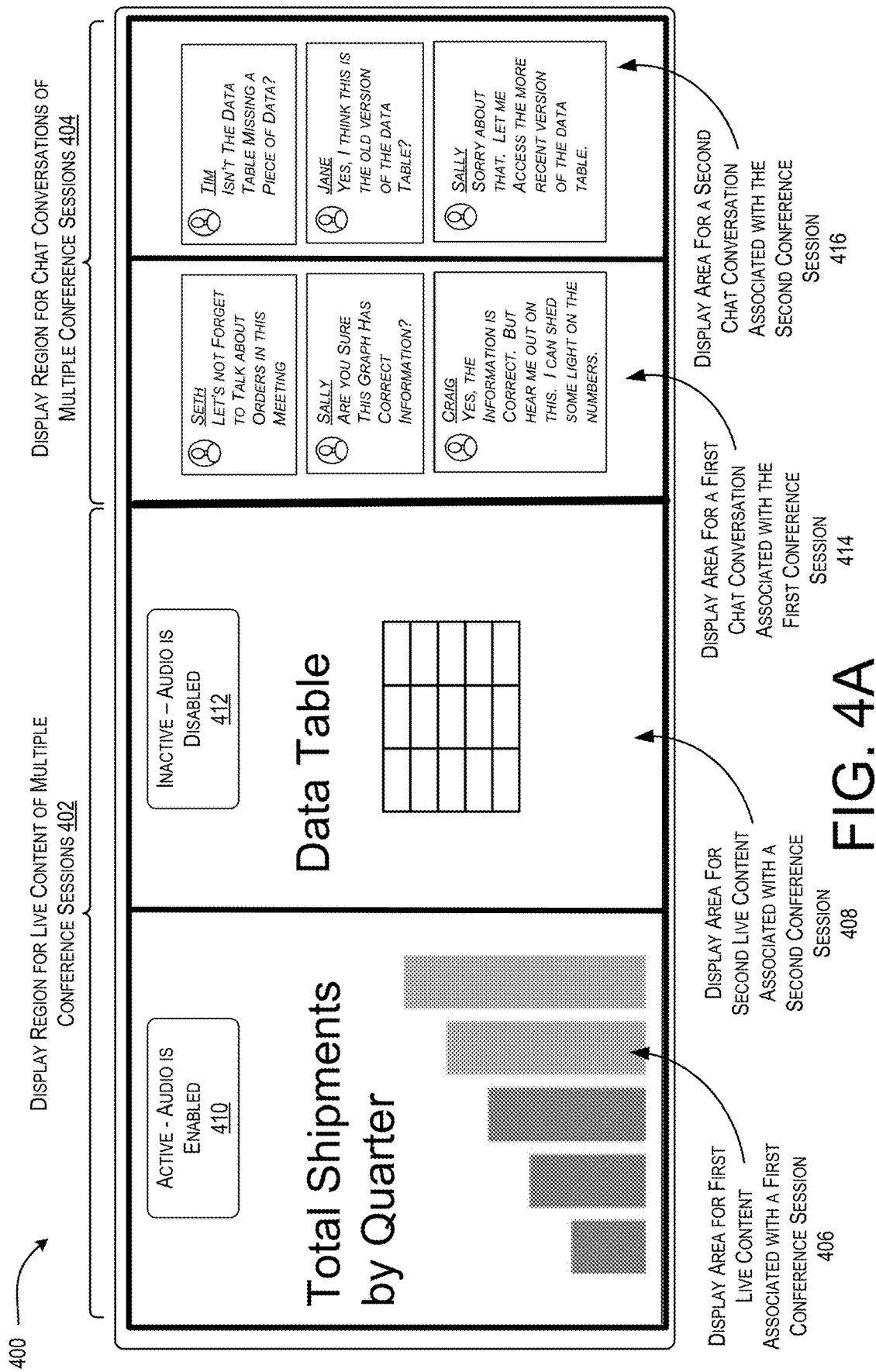

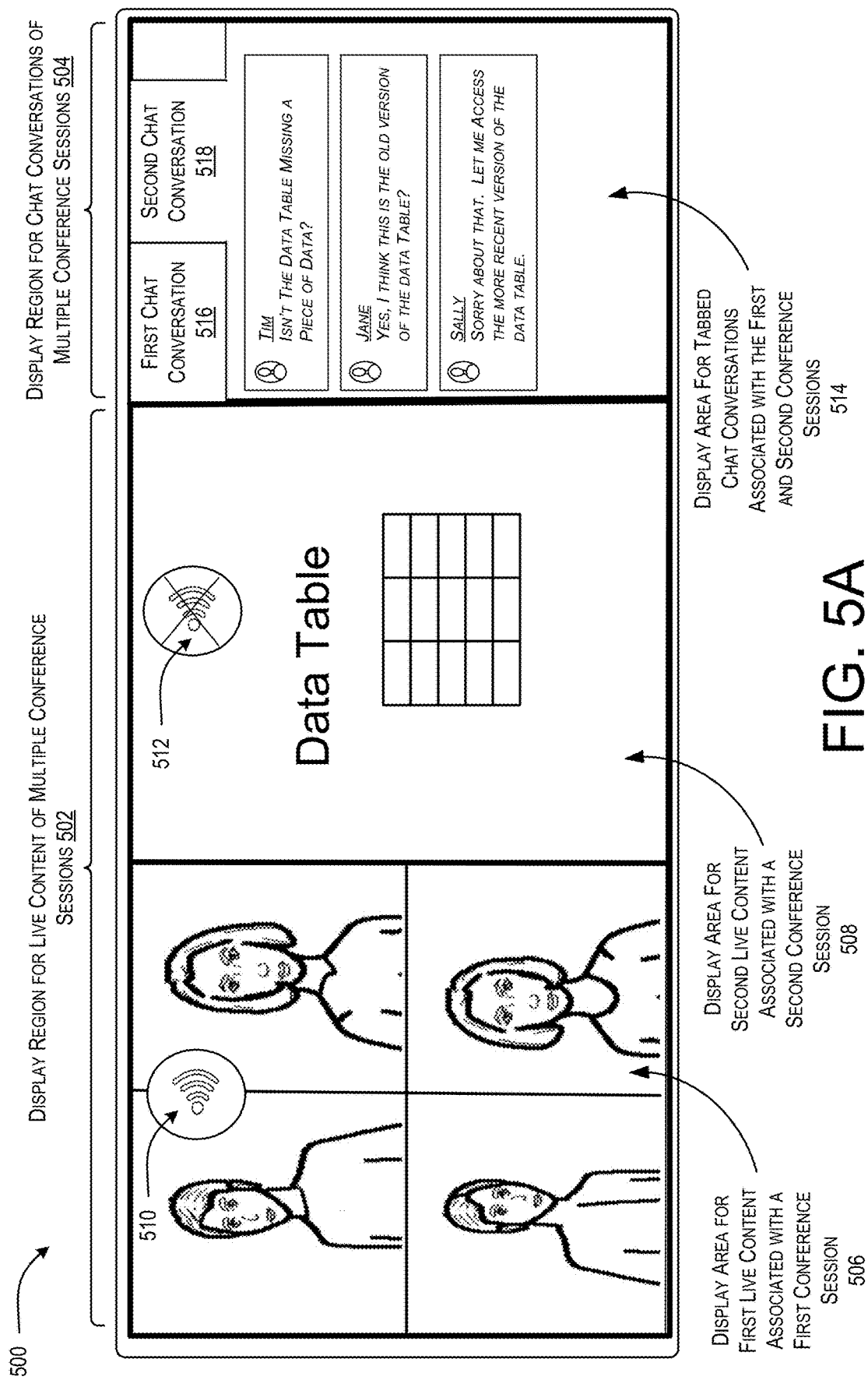

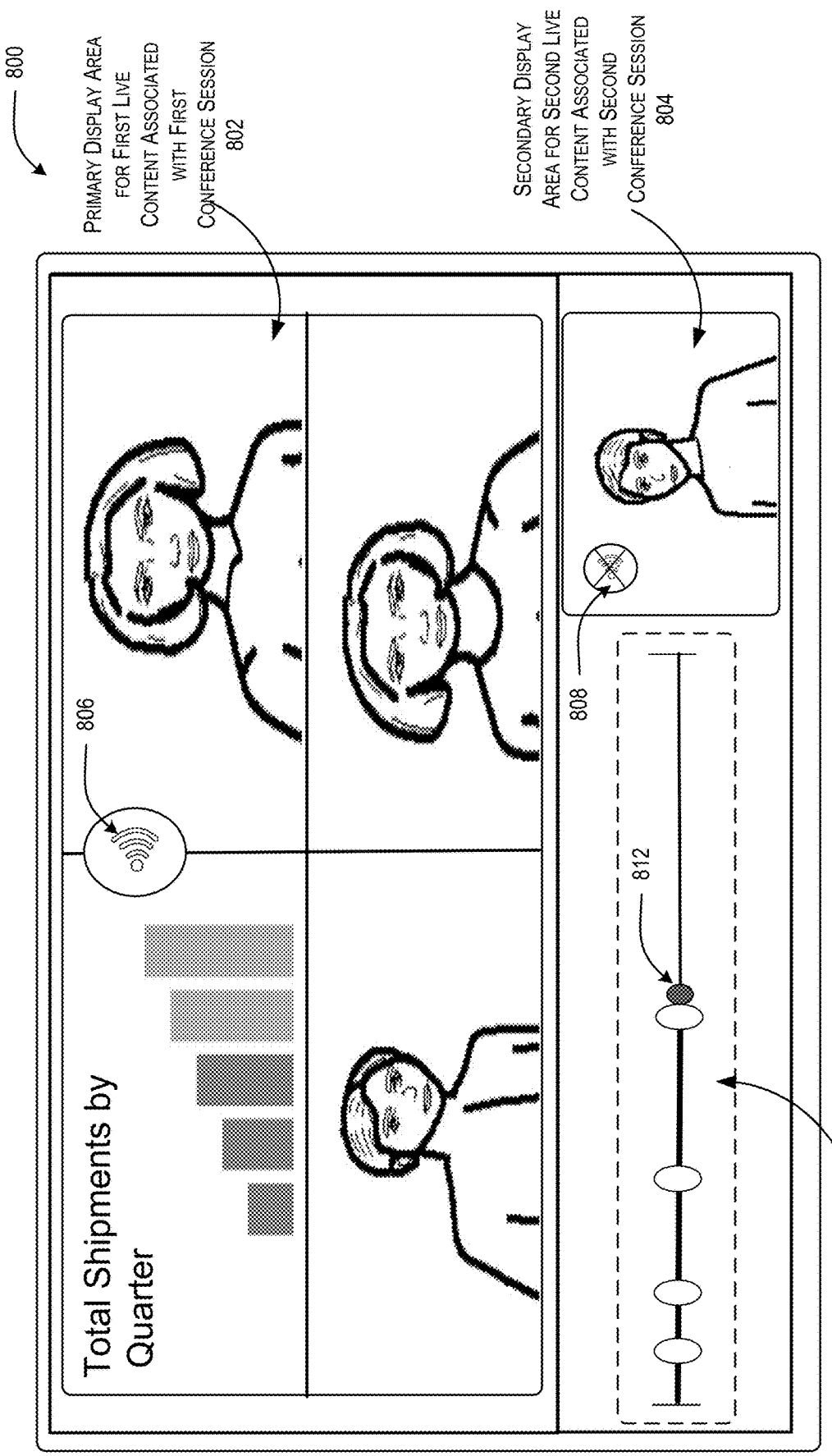

US 10,547,654 B2

CONCURRENT ENGAGEMENT WITH LIVE CONTENT OF MULTIPLE CONFERENCE SESSIONS

BACKGROUND

At present, the use of conference (e.g., videoconference) systems in personal and commercial settings has increased dramatically so that meetings between people in remote locations can be facilitated. Conference systems allow users, in two or more remote locations, to communicate interactively with each other via live, simultaneous two-way video streams, audio streams, or both. Some conference systems (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS provided by the MICROSOFT CORPORATION, of Redmond, Wash.) also allow users to exchange files and/or share display screens that present, for example, images, text, video, applications, online locations, social media, and any others.

Consequently, conference systems enable a user to participate in a conference session (e.g., a meeting) via a remote device. In some scenarios, the user may be scheduled to participate in multiple conference sessions at the same time (e.g., the user's calendar is double booked for a given time period). In these types of scenarios, the user typically has to decide which of the multiple conference sessions to participate in, and part of that decision means that the user does not participate in other ones of the multiple conference sessions (e.g., the user ignores or skips other meetings which the user has been invited to participate in).

SUMMARY

The disclosed techniques address the problems described above with regards to a conference session. Specifically, the disclosed techniques are configured to enable a user to concurrently engage with live content of multiple conference sessions at the same time. As described with respect to examples provided herein, "live" content of a conference session comprises content that is currently being shared and/or exchanged between client computing devices (e.g., during a live viewing of the conference session as the conference session is initially being conducted). The live content can comprise one instance or a collection of various instances, or streams. For example, an individual stream can comprise one or more of a video feed (e.g., audio and visual data) that captures the appearance and speech of a user participating in the conference session, an avatar of a user participating in the conference session, audio data that captures the speech of the user participating in the conference session, a file shared via a client computing device (e.g., to enable a group edit of a document), or a screen (e.g., desktop screen shared via a client computing device.

Using the techniques described herein, a user is able to concurrently engage with live content of multiple conference sessions that happen to be occurring at the same time. For instance, two or more conference sessions may be scheduled for the same time period (e.g., 1:00-2:00 PM). Or, the end of one conference session may overlap with, or extend into, the start of another conference session. Thus, the techniques described herein support improved conference engagement capabilities by enabling the user to be connected to, and manage the engagement with, different conference sessions. More specifically, the user can be fully engaged with one conference session and partially engaged with other conference session(s) in the same experience (e.g., a single user interface, a single window, etc.) so that the user can monitor activity that occurs in the other conference session(s). In various examples, full engagement includes audio output of the live content of a conference session, and partial engagement does not include audio output of the live content of a conference session (e.g., a client computing device only outputs audio for one conference session). Furthermore, the techniques configure and display controls that allow a user to efficiently switch engagement levels when important activity occurs (e.g., enable the audio for live content of one conference session while disabling the audio for live content of another conference session). Consequently, the user can manage his or her time better, as well as multi-task and do more (e.g., edit files, monitor various conference sessions for important activity, etc.).

Described herein is a conference system that allows a user to join and participate in multiple (e.g., two or more) conference sessions at the same time. Moreover, the conference system enables the user to manage concurrent engagement with live content of the multiple conference sessions. Accordingly, the conference system is configured to receive, from a client computing device, request(s) to engage with live content associated with multiple conference sessions concurrently. That is, a user can join live viewings of multiple conference sessions at the same time or close to the same time, or the user can join a live viewing of a first conference session and, at a later time, before the live viewing of the first conference session has ended, join a live viewing of another conference session.

As further described with respect to examples provided herein, a single user interface is configured to enable the concurrent engagement with live content of multiple conference sessions via an adjacent view (e.g., side-by-side, one on top of the other, etc.) or a tabbed view. The user interface can be generated and displayed by the conference system. The adjacent view can comprise an active stage and an inactive stage. A "stage" can comprise a display area of the user interface. Thus, first live content associated with a first conference session can be displayed in a first display area, and second live content associated with a second conference session can concurrently be displayed in a second display area that is adjacent to the first display area. One of the display areas is active such that audio output is enabled and the user is fully engaged with the live content included therein. Consequently, other ones of the display areas are inactive such that audio output is disabled, and the user is only partially engaged with the live content included therein (e.g., the user can view and monitor activity but cannot hear the audio associated with such activity). A display area and the live content displayed therein can be designated as active based on user selection of control elements and/or requests associated with the user selection of such control elements.

In additional examples, a user interface generated and displayed by the conference system is configured to format live content of multiple conference sessions in a tabbed view. The tabbed view enables the user to manage the concurrent engagement with first live content associated with a first conference session and second live content associated with a second conference session via the selection of a tab. That is, the user can effectively switch between having the first live content displayed and having the second live content displayed by selecting corresponding tabs associated with the first and second conference sessions. In the tabbed view configuration, the tab currently selected and the live content currently displayed are active such that audio output is enabled and the user is fully engaged with the live content included therein. As further described herein, the user can stay partially engaged with other conference sessions by monitoring chat conversations to determine when important activity occurs and to subsequently switch the engagement level.

To enhance the collaboration and group activity experience, the user interface generated and displayed by the conference system can also include chat conversations. A chat conversation can be associated with, or part of, a conference session. In this way, participants to a conference session can communicate via messaging (e.g., text) in addition to audible communications. Therefore, in accordance with examples described herein, the user interface can be divided into a display region configured to display live content associated with multiple conference sessions (e.g., via an adjacent view, via a tabbed view, etc.) and a display region configured to display chat conversations associated with the multiple conference sessions. An individual display region can include multiple display areas (e.g., a first display area to display first live content, a second display area to display second live content, etc.). In some implementations, the display areas within a display region can be of equal size. Similar to the ways in which a user can engage with the live content, the user can also engage with multiple chat conversations via an adjacent view or a tabbed view.

The conference system is further configured to detect an occurrence of a notable event in live content for which audio is not being output and/or in a chat conversation that is not currently viewable via a display screen (e.g., a corresponding tab is not selected). Based on the detection, the conference system can generate a notification and cause the notification to be displayed. For example, the notification can comprise a popup notification indicating that a notable event occurred in live content of a conference session for which audio is not being output. In another example, the notification can be a change in the visual appearance of a tab (e.g., change in color or boldness, change in pattern, a flashing tab, etc.). By viewing the notification, the user is aware that important activity has occurred and/or is being missed, and based on this awareness, the user can make an informed decision on whether to switch between an engagement level to enable audio for the live content and/or to view a chat conversation of another conference session.

In various examples, a notable event includes activity (e.g., one or more actions) in a conference session that is considered to be important or relevant to the conference session and/or to the user. The notable events can be of a variety of different types. Example types of notable events can include: a specific mention of a user identity (e.g., an "@mention" of a user name), a file or a display screen that is shared (e.g., a document, a presentation, a spreadsheet, a video, a web page, etc.), a change in file content being shared (e.g., a flip from one slide or one page to the next, an edit to a document, etc.), a poll that requests input from participants, a task that is assigned, an explicit flag added to an interactive timeline by a user to mark an important moment, a time period of concentrated activity (e.g., an increased or threshold number of participants speak in a defined shortened period of time), or any other activity determined to provide value or contribute to understanding a context of the conference session. In various examples, a user can define, as a setting, which types of notable events trigger generation and display of a notification to make the user aware of important activity being missed.

In various examples, the conference system is configured to generate and display a timeline associated with a conference session. The timeline includes representations (e.g., markers, symbols, icons, nodes, thumbnails, etc.) of notable events that are associated with a conference session. Furthermore, the timeline is interactive (e.g., referred to herein as an "interactive timeline") such that a user is able to interact with individual representations on the timeline. When switching engagement levels to view and/or hear live content of a conference session, the interactive timeline can serve as an efficient and an effective tool for the user to locate important activity that was missed while the user was only partially engaged with the live content of the conference session.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), device(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4A illustrates an example graphical user interface configured to display both live content and chat conversations of multiple conference sessions in an adjacent view.

FIG. 5A illustrates an example graphical user interface configured to display live content of multiple conference sessions in an adjacent view and chat conversations of the multiple conference sessions in a tabbed view.

FIG. 8A illustrates an example graphical user interface configured to concurrently display live content of two conference sessions in a primary display area and a secondary display area.

DETAILED DESCRIPTION

Examples described herein enable a system and/or device to enable a user to concurrently engage with live content and/or chat conversations of multiple conference sessions at the same time. The concurrent engagement is enabled within a single user interface. The user interface is configured to enable the concurrent engagement with live content and/or chat conversations of multiple conference sessions via an adjacent view (e.g., side-by-side, top and bottom, etc.) or a tabbed view. The live content associated with the multiple conference sessions can be configured for display in a first display region. The chat conversations associated with the multiple conference sessions can be configured for display in a second display region that is adjacent to the first display region. Consequently, a user is able to manage levels of engagement with live content and chat conversations of multiple conference sessions, and switch the levels of engagement amongst the multiple conference sessions to view and/or hear activity across the multiple conference sessions.

In various examples, full engagement includes audio output of live content of a conference session currently being displayed (e.g., a user can view and hear the live content). Partial engagement does not include audio output of live content of a conference session, and in some instances, may not even include the display of the live content either (e.g., the user cannot view and cannot hear the live content). However, the user can monitor a chat conversation and/or the display screen for notifications to determine when important activity occurs in a conference session with which the user is partially engaged.

Various examples, implementations, scenarios, and aspects are described below with reference to FIGS. 1 through 11.

Figure 1:
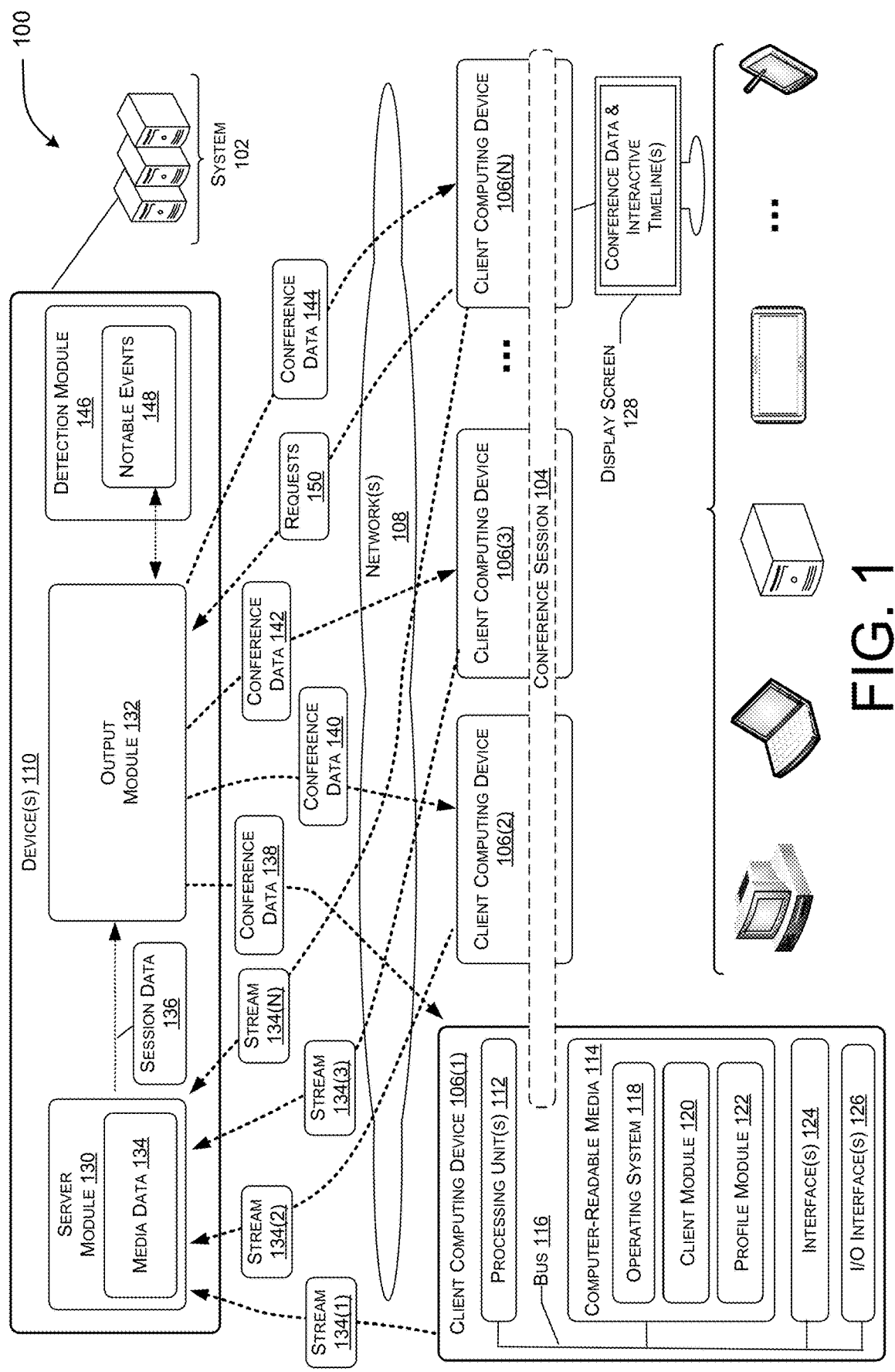
FIG. 1 is a diagram illustrating an example environment in which a system and/or device enable a user to concurrently engage with live content and/or chat conversations associated with multiple conference sessions.

FIG. 1 is a diagram illustrating an example environment 100 in which a system 102 (e.g., a conference system) can operate to cause live content of a conference session 104 to be displayed on a client computing device. In this example, the conference session 104 is being implemented between a number of client computing devices 106(1) through 106(N) (where N is a positive integer number having a value of two or greater). The client computing devices 106(1) through 106(N) enable users to participate in the conference session 104. In this example, the conference session 104 is hosted, over one or more network(s) 108, by the system 102. That is, the system 102 can provide a service that enables users of the client computing devices 106(1) through 106(N) to participate in the conference session 104. Consequently, a "participant" to the conference session 104 can comprise a user and/or a client computing device (e.g., multiple users may be in a conference room participating in a conference session via the use of a single client computing device), each of which can communicate with other participants. As an alternative, the conference session 104 can be hosted by one of the client computing devices 106(1) through 106(N) utilizing peer-to-peer technologies.

In examples described herein, client computing devices 106(1) through 106(N) participating in the conference session 104 are configured to receive and render for display, on a user interface of a display screen, conference data. The conference data can comprise one instance or a collection of various instances, or streams, of live content. For example, an individual stream of live content can comprise media data associated with a video feed (e.g., audio and visual data that capture the appearance and speech of a user participating in the conference session). Another example of an individual stream of live content can comprise media data that includes an avatar of a user participating in the conference session along with audio data that captures the speech of the user. Yet another example of an individual stream of live content can comprise media data that includes a file displayed on a display screen and/or audio data that captures the speech of a user. Accordingly, the various streams of the live content within the conference data enable a remote meeting to be facilitated between a group of people and the sharing of content within the group of people.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more conference sessions such as conference session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 1 illustrates that client computing device 106(N) is in some way connected to a display device (e.g., a display screen 128), which can display the conference data and/or an interactive timeline(s) for conference sessions.

In the example environment 100 of FIG. 1, client computing devices 106(1) through 106(N) may use their respective client modules 120 to connect with one another and/or other external device(s) in order to participate in the conference session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for conference sessions.

As shown in FIG. 1, the device(s) 110 of the system 102 includes a server module 130 and an output module 132. The server module 130 is configured to receive, from individual client computing devices such as client computing devices 106(1) through 106(N), media streams 134(1) through 134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(N) (the collection being referred to herein as media data 134). In some scenarios, not all the client computing devices that participate in the conference session 104 provide a media stream. For example, a client computing device may only be a consuming, or a "listening", device such that it only receives content associated with the conference session 104 but does not provide any content to the conference session 104.

The server module 130 is configured to generate session data 136 based on the media data 134. In various examples, the server module 130 can select aspects of the media data 134 that are to be shared with the participating client computing devices 106(1) through 106(N). Consequently, the server module 130 is configured to pass the session data 136 to the output module 132 and the output module 132 may communicate conference data to the client computing devices 106(1) through 106(N). As shown, the output module 132 transmits conference data 138 to client computing device 106(1), transmits conference data 140 to client computing device 106(2), transmits conference data 142 to client computing device 106(3), and transmits conference data 144 to client computing device 106(N). The conference data transmitted to the client computing devices can be the same or can be different (e.g., streams and/or the positioning of streams of content within a view of the user interface may vary from one device to the next). The output module 132 can also be configured to record conference sessions (e.g., a version of the conference data) and/or to maintain recordings of the conference sessions.

The device(s) 110 can also include a detection module 146 configured to detect occurrences of notable events 148 in the session data 136 of a conference session. For instance, a notable event 148 can occur as a live viewing of a conference session is progressing such that activity that amounts to a notable event by users of client computing devices 106(1) through 106(N) that are participating via the live viewing can be detected and/or added to an interactive timeline.

Examples types of notable events 150 can include: a specific mention of a user identity (e.g., an "@mention"), a specific mention of a team, a file or a display screen that is shared (e.g., a document, a presentation, a spreadsheet, a video, a web page, etc.), a change to a file or a display screen that is shared (e.g., a change from one page or slide to the next, a document edit, etc.), a comment that is submitted to a chat conversation that is associated with (e.g., is part of) the conference session, a task that is assigned, a poll that is conducted, an expression (e.g., an emoji) that is shared, a link to an external object such as another conference session (e.g., a link to a newly scheduled meeting while a current meeting is being conducted), a user joining the conference session, a user leaving the conference session, an explicit flag added to the interactive timeline by a user to mark an important moment, a time period of concentrated activity, or any other activity determined to provide value or contribute to understanding a context of the conference session.

As further described herein, a client computing device such as client computing device 106(N) can provide request(s) 150 directed to managing concurrent engagement with live content of multiple conference sessions. For example, a request 150 may be associated with a user joining a conference session. In another example, a request 150 can be associated with user selection of a control to switch engagement levels (e.g., enable and/or disable audio for live content of a conference session, switch the display of live content via selection of a tab, switch the display of a chat conversation via selection of a tab, etc.). In response to the requests 150, the output module 132 enables concurrent engagement with live content and/or chat conversations of multiple conference sessions, as well as effective management of the levels of engagement with the live content and/or the chat conversations of multiple conference sessions.

Figure 2:
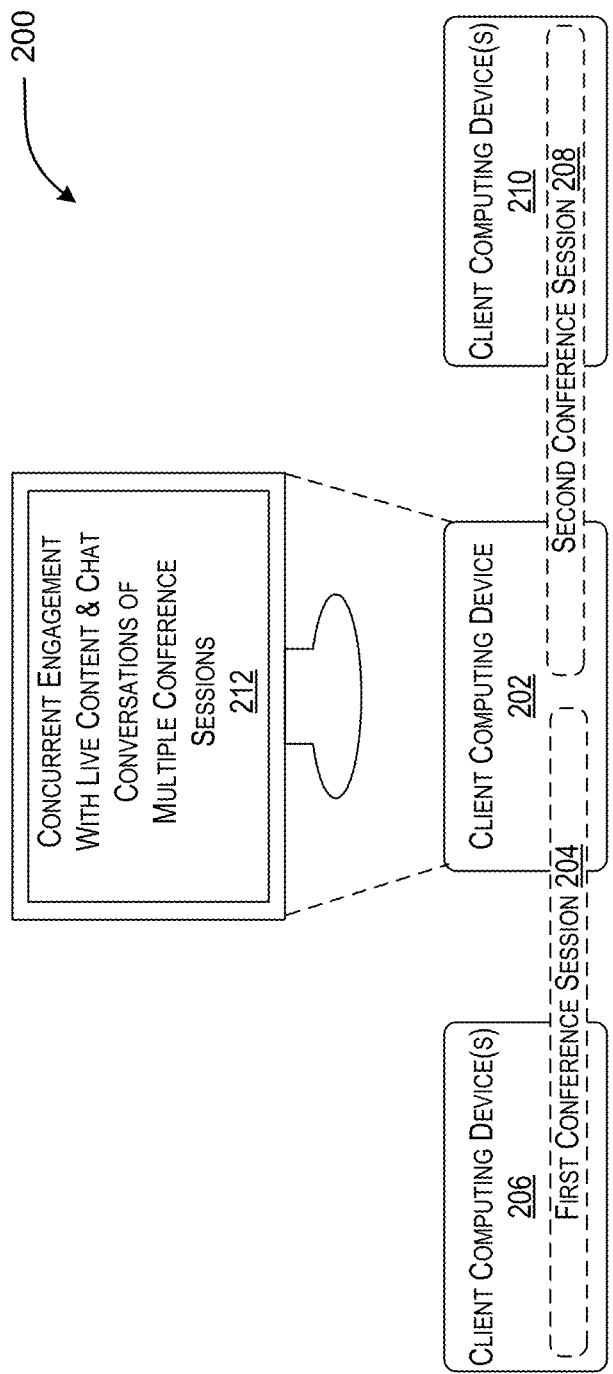
FIG. 2 is a diagram illustrating a scenario in which a client computing device has joined multiple conference sessions, and thus, a user of the client computing device is enabled to concurrently engage with live content and/or chat conversations of the multiple conference sessions.

FIG. 2 is a diagram illustrating a scenario 200 in which a client computing device 202 has joined multiple conference sessions. As shown, the client computing device 202 has joined a first conference session 204 which has a first group of client computing devices 206 as participants, and as the live viewing of the first conference session 204 is being conducted, the client computing device 202 joins a second conference session 208 which has a second group of client computing devices 120 as participants (e.g., the groups of client computing devices 206 and 210 are likely different). Consequently, a user of the client computing device 202 is enabled to concurrently engage with live content and/or chat conversations of the multiple conference sessions, as illustrated on the display screen by 212. While FIG. 2, as well as other figures described herein, illustrate two conference sessions for ease of discussion, it is understood in the context of this document that a user can be enabled to concurrently engage with more than two conference sessions (e.g., three, four, five, and so forth) at a given time.

Figure 3:
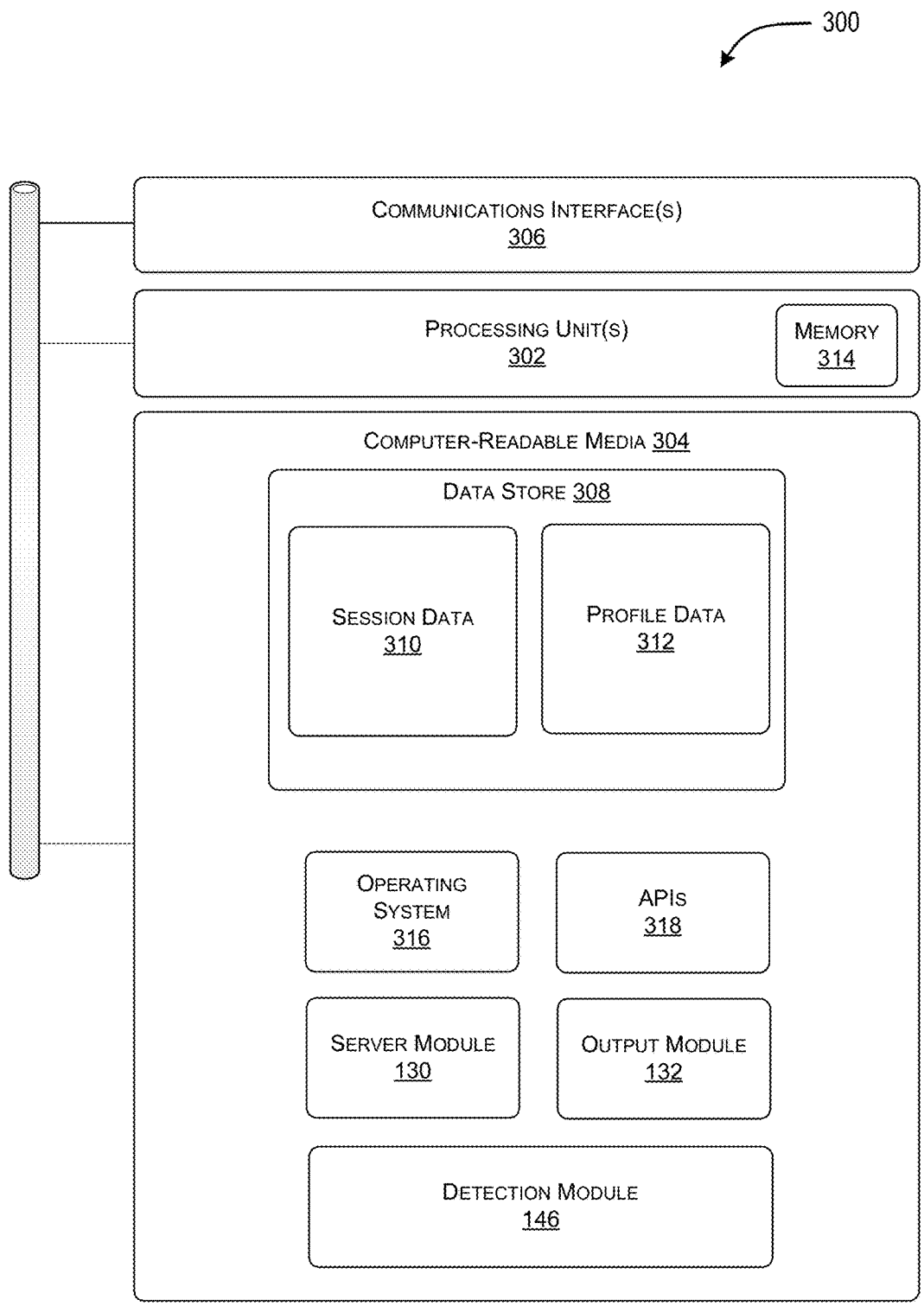
FIG. 3 is a diagram illustrating example components of an example device configured to enable a user to concurrently engage with live content and/or chat conversations associated with multiple conference sessions.

FIG. 3 is a diagram illustrating example components of an example device 300 configured to enable a user to concurrently engage with live content and/or chat conversations associated with multiple conference sessions. The device 300 may represent one of device(s) 110, or in other examples a client computing device, where the device 300 includes one or more processing unit(s) 302, computer-readable media 304, and communication interface(s) 306. The components of the device 300 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 302 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS SPs"), System-on-a-Chip Systems ("SOCs"), Complex Programmable Logic Devices ("CPLDs"), etc.

As utilized herein, computer-readable media, such as computer-readable media 304 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 306 may represent, for example, network interface controllers ("NICs") or other types of transceiver devices to send and receive communications over a network.

In the illustrated example, computer-readable media 304 includes a data store 308. In some examples, data store 308 includes data storage such as a database, data warehouse, or other type of structured or unstructured data storage. In some examples, data store 308 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 308 may store data for the operations of processes, applications, components, and/or modules stored in computer-readable media 304 and/or executed by processing unit(s) 302. For instance, in some examples, data store 308 may store session data 310 (e.g., session data 136), profile data 312 (e.g., associated with a participant profile), and/or other data. The session data 310 can include a total number of participants (e.g., users and/or client computing devices) in a conference session, activity that occurs in the conference session (e.g., notable events), and/or other data related to when and how the conference session is conducted or hosted.

Alternately, some or all of the above-referenced data can be stored on separate memories 314 on board one or more processing unit(s) 302 such as a memory on board a CPU-type processor, a GPU-type processor, an FPGA-type accelerator, a DSP-type accelerator, and/or another accelerator. In this example, the computer-readable media 304 also includes operating system 316 and application programming interface(s) 318 configured to expose the functionality and the data of the device 300 to other devices. Additionally, the computer-readable media 304 can include one or more modules such as the server module 130, the output module 132, and the detection module 146, although the number of illustrated modules is just an example, and the number may vary higher or lower. That is, functionality described herein in association with the illustrated modules may be performed by a fewer number of modules or a larger number of modules on one device or spread across multiple devices.

FIG. 4A illustrates an example graphical user interface 400 configured to display both live content and chat conversations of multiple conference sessions in an adjacent view. The output module 132 can generate and cause a client computing device to render (e.g., via transmission of conference data and/or commands) the example graphical user interface 400 on a display screen, based on requests received from the client computing device.

As shown, the example graphical user interface 400 includes a display region 402 for live content of the multiple conference sessions, and an adjacent display region 404 for chat conversations of the multiple conference sessions. The display region 402 for live content of the multiple conference sessions includes a display area 406 for first live content associated with a first conference session, as well as a display area 408 for second live content associated with a second conference session. The display areas 406 and 408 are adjacent to one another so that a user viewing the example graphical user interface 400 can be concurrently engaged with both the first live content of the first conference session (e.g., a slide of a presentation that illustrates a bar graph associated with "Total Shipments by Quarter") and the second live content of the second conference session (e.g., a slide of a presentation that illustrates a "Data Table").

In this example, the user is more engaged with the first live content of the first conference session than the second live content of the second conference session, and accordingly, the example graphical user interface 400 illustrates an indicator 410 that the first live content displayed in the display area 406 is "active" and the "audio is enabled" to be output by the client computing device (e.g., in accordance with volume controls). In contrast, the example graphical user interface 400 illustrates another indicator 412 that the second live content displayed in the display area 408 is "inactive" and the "audio is disabled," and thus cannot be output by the client computing device. However, even though the user cannot hear the audio of the second live content, the user can stay partially engaged with the second live content by viewing the "Data Table" slide in the display area 408 and/or viewing any visual activity that occurs in association with the "Data Table" slide (e.g., an edit to a document by a participant).

In various examples, the indicators 410 and/or 412 can also be selectable control elements that enable the user to switch levels of engagement with the first and second live content. For instance, by selecting (e.g., clicking on) the indicator 412, the display area 408 can be switched from being the inactive display area to being the active display area such that the audio for the second live content is enabled and can be output by the client computing device. In accordance with the switch, the audio for the first live content is disabled. The user may select the control element to switch the level of engagement by monitoring the display area 408 and seeing when important visual activity occurs (e.g., an incorrect edit to the "Data Table" slide is made) while listening to the audio of the first live content displayed in the display area 406.

The display region 404 for the chat conversations of the multiple conference sessions also includes a display area 414 for a first chat conversation associated with the first conference session, as well as a display area 416 for a second chat conversation associated with the second conference session. The display areas 414 and 416 are adjacent to one another so that a user viewing the example graphical user interface 400 can be concurrently engaged with both the first chat conversation (e.g., where Seth, Sally, and Craig have recently posted a comment) and the second chat conversation (e.g., where Tim, Jane, and Sally have recently posted a comment). In this example, the user concurrently engaged with multiple conference session is "Sally", and the chat conversation in display area 416 provides another way for Sally to stay partially engaged with the second live content in the display area 408 for which audio is disabled (e.g., as shown, Sally can monitor the comments being posted in the chat conversation associated with the second live content and even post comments herself).

In various examples, the display areas 406 and 408 within the display region 402 configured to display live content associated with multiple conference session can be of equal size. Moreover, the display areas 414 and 416 within the display region 404 configured to display chat conversations associated with multiple conference session can be of equal size. As shown in this example where a user is concurrently engaged with two conference sessions, an adjacent view can split the display regions 402 and/or 404 in a horizontal direction. Alternatively, an adjacent view can split the display regions 402 and 404 in a vertical direction.

In various examples, the output module 132 can generate and cause a status indicator to be communicated to other client computing devices. When displayed, the status indicator informs other participants that the audio for the second live content has been disabled for a particular client computing device, and therefore, the user is unable to hear audible communications that occur in the second conference session.

Figure 4B:
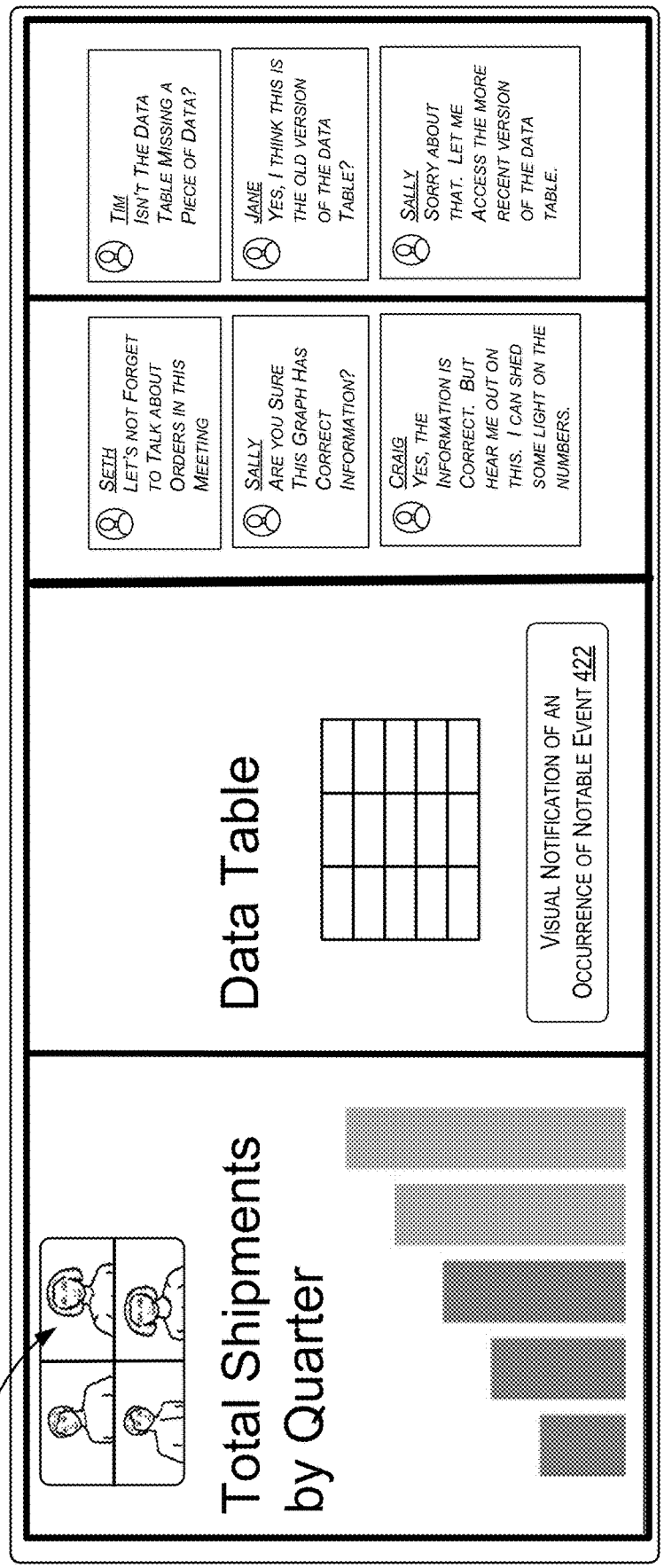
FIG. 4B illustrates an example graphical user interface configured to display a monitor comprising video streams associated with people participating in a conference session and a visual notification of an occurrence of a notable event in live content.

FIG. 4B illustrates an example graphical user interface 418 configured to display a monitor 420 comprising video streams associated with people participating in a conference session and a visual notification 422 of an occurrence of a notable event. The live content and the chat conversations shown in FIG. 4B are the same as that shown in FIG. 4A.

The monitor 420 allows the user to view activity (e.g., facial expressions, gestures, etc.) performed by the people participating in the first conference session in association with the output of the audio (e.g., the display area 406 is active and audio is enabled for the first live content). Accordingly, the monitor 420 can be used in scenarios where participants to a conference session are viewing file data on a main stage, yet video streams of the participants, which are also part of the live content, can also be viewed via an alternative stage (e.g., the monitor 420). The monitor 420 can be displayed as an overlay within the display area 406 to establish a graphical association between the monitor 420 and the first conference session.

As described above, the detection module 146 can detect the occurrence of a notable event. For example, a participant may say the user's name (e.g., "Sally"). Upon detection of a notable event that occurs in live content with which the user is only partially engaged (e.g., audio is disabled), the output module 132 can generate and communicate a visual notification 422 to be displayed. The visual notification 422 indicates the occurrence of the notable event and can be graphically associated with the live content in which the notable event occurs (e.g., displayed as an overlay notification within the display area 408). In some instances, the visual notification 422 includes the type of notable event (e.g., a mention of the name "Sally"). Thus, the user, upon seeing the visual notification, can make an informed decision on whether to fully engage with the second live content (e.g., based on an importance of the type of notable event to the user). In some examples, the user can define settings that specify the types of notable events for which a visual notification will be displayed.

FIG. 5A illustrates an example graphical user interface 500 configured to display live content of multiple conference sessions in an adjacent view and chat conversations of the multiple conference sessions in a tabbed view. Again, the output module 132 can generate and cause a client computing device to render (e.g., via transmission of conference data and/or commands) the example graphical user interface 500 on a display screen, based on requests received from the client computing device.

As shown, the example graphical user interface 500 includes a display region 502 for live content of the multiple conference sessions, and an adjacent display region 504 for chat conversations of the multiple conference sessions. Similar to FIGS. 4A and 4B, the display region 502 for live content of the multiple conference sessions includes a display area 506 for first live content associated with a first conference session, as well as a display area 508 for second live content associated with a second conference session. The display areas 506 and 508 are adjacent to one another so that a user viewing the example graphical user interface 500 can be concurrently engaged with both the first live content of the first conference session (e.g., a grid view where with four cells each comprising a video stream of a user) and the second live content of the second conference session (e.g., a slide of a presentation that illustrates a "Data Table").

In this example, the user is more engaged with the first live content of the first conference session than the second live content of the second conference session, and accordingly, the example graphical user interface 500 illustrates an indicator 510 that the first live content displayed in the display area 506 has audio enabled to be output by the client computing device. In contrast, the example graphical user interface 500 illustrates another indicator 512 that the second live content displayed in the display area 508 has the audio disabled, and thus user communications cannot be audibly output by the client computing device. Similar to FIG. 4A, the indicators 510 and/or 512 can also be selectable control elements that enable the user to switch levels of engagement with the first and second live content.

The display region 504 for the chat conversations of the multiple conference sessions includes a display area 514 for tabbed chat conversations associated with the first and second conference sessions. By using the tabbed view instead of the adjacent view, the size of the display region 504 may be smaller compared to the size of the display region 404 configured for the adjacent view in FIG. 4A, for example. This can provide more display space for the user to engage with the live content (e.g., the size of display region 502 can be larger than the size of the display region 402 in FIG. 4A). Thus, the display area 514 includes a first tab 516 for a first chat conversation associated with the first conference session and a second tab 518 for a second chat conversation associated with the second conference session. The user can select one of the first tab 516 or the second tab 518 to switch between viewing the first chat conversation and viewing the second chat conversation. The selection of one of the tabs 516 and 518 can be performed while the user is simultaneously viewing the first live content (e.g., audio enabled) and the second live content (e.g., audio disabled). As shown in this example, the user has selected the second tab 518 so that comments associated with the second live content can be monitored for relevant activity while the user listens to the audio output of the first live content.

Figure 5B:
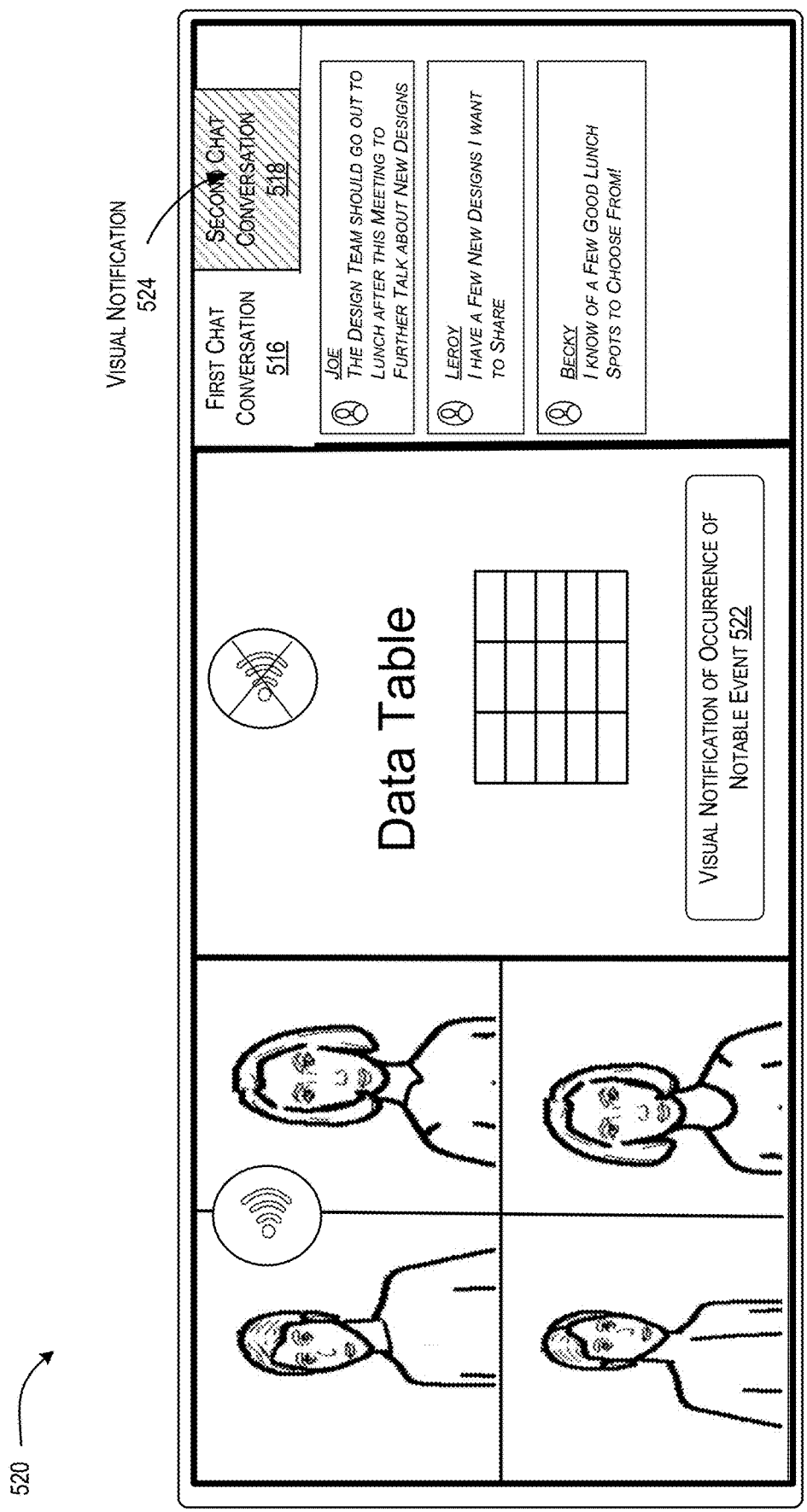
FIG. 5B illustrates an example graphical user interface configured to display a first visual notification of an occurrence of a notable event in live content and a second visual notification of an occurrence of a notable event in a chat conversation.

FIG. 5B illustrates an example graphical user interface 520 configured to display a first visual notification 522 of an occurrence of a notable event in live content and a second visual notification 524 of an occurrence of a notable event in a chat conversation. The live content and the chat conversations shown in FIG. 5B are the same as that shown in FIG. 5A, except the user has selected the first tab 516 so that the first chat conversation is displayed.

Upon detection of a notable event that occurs in live content with which the user is only partially engaged (e.g., audio is disabled), the output module 132 can generate and communicate a visual notification 522 to be displayed in association with the live content (e.g., within the display area 508). Moreover, upon detection of a notable event that occurs in a chat conversation, the output module 132 can generate and communicate a visual notification 524 in association with a chat conversation. For instance, if someone types the user's name (e.g., "@sally") in a comment within the second chat conversation while the user is viewing the first chat conversation, then the output module 132 can cause the second tab 518 associated with the second chat conversation to change colors, change patterns, flash, etc., to attract the user's attention.

Figure 6A:
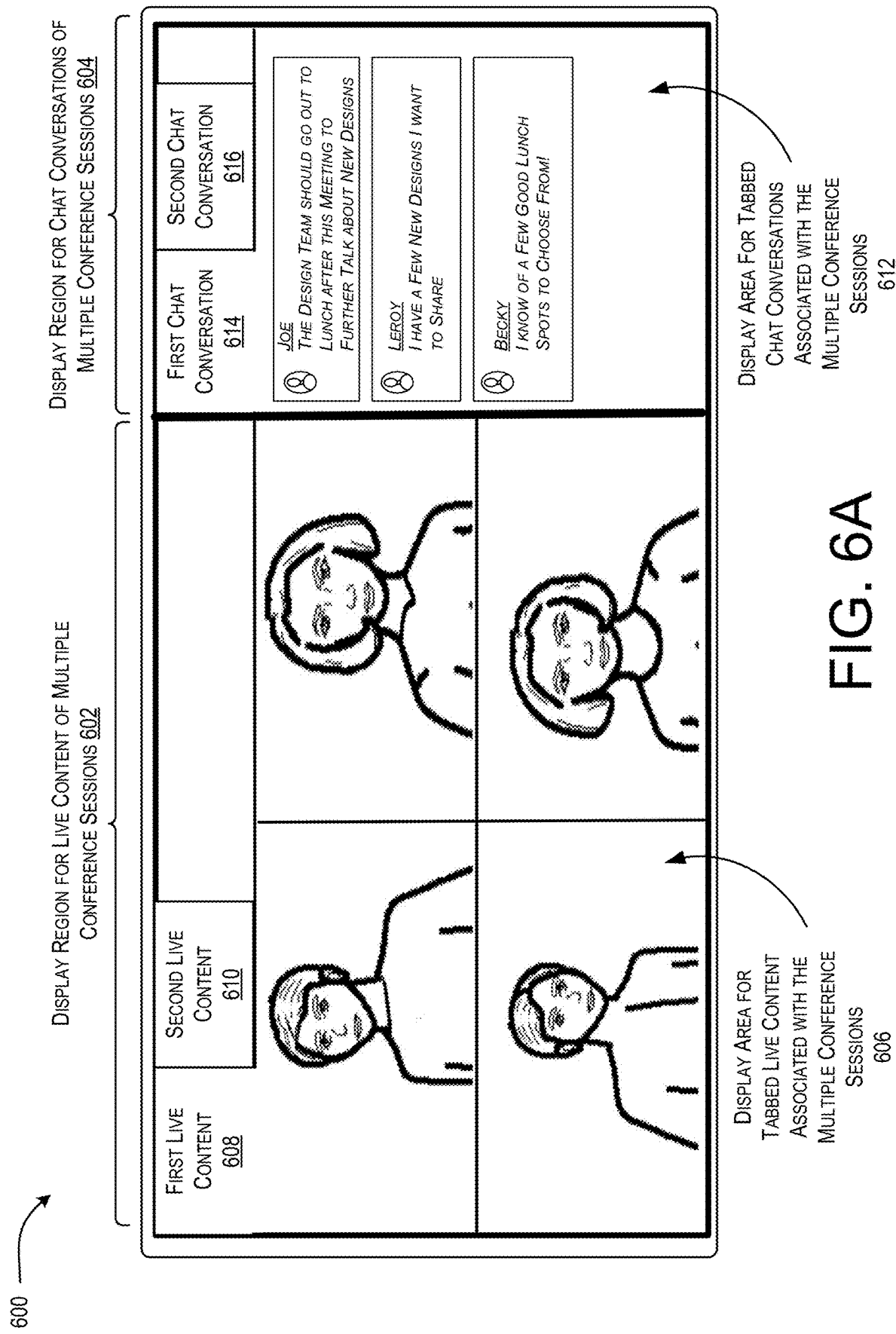
FIG. 6A illustrates an example graphical user interface configured to display both live content and chat conversations of multiple conference sessions in a tabbed view.

FIG. 6A illustrates an example graphical user interface 600 configured to display both live content and chat conversations of multiple conference sessions in a tabbed view. The output module 132 can generate and cause a client computing device to render (e.g., via transmission of conference data and/or commands) the example graphical user interface 600 on a display screen, based on requests received from the client computing device.

As shown, the example graphical user interface 600 includes a display region 602 for live content of the multiple conference sessions, and an adjacent display region 604 for chat conversations of the multiple conference sessions. The display region 602 for live content of the multiple conference sessions includes a display area 606 for tabbed live content associated with the multiple conference sessions. For example, the display area 606 includes a first tab 608 for the first live content associated with a first conference session and a second tab 610 for second live content associated with a second conference session. By using the tabbed view instead of the adjacent view, the size of the display area 606 for an instance of live content is larger compared to the size of the display area 506, for example. However, using the tabbed view instead of the adjacent view, the user is unable to concurrently view both the first live content and the second live content.

The user can switch between viewing the first live content and the second live content by selecting the first tab 608 and the second tab 610. As shown in FIG. 6A, the user has selected the first tab 608, and thus, the first live content associated with the first conference session is currently and actively displayed (e.g., a grid view where with four cells each comprising a video stream of a user). Thus, audio is enabled for the first live content, and disabled for the second live content of the second conference session.

The display region 604 for the chat conversations of the multiple conference sessions includes a display area 612 for tabbed chat conversations associated with the first and second conference sessions. The display area 612 includes a first tab 614 for a first chat conversation associated with the first conference session and a second tab 616 for a second chat conversation associated with the second conference session. The user can select one of the first tab 614 or the second tab 616 to switch between viewing the first chat conversation and viewing the second chat conversation. As shown in this example, the user has selected the first tab 614 so that comments associated with the first live content can be viewed.

Figure 6B:
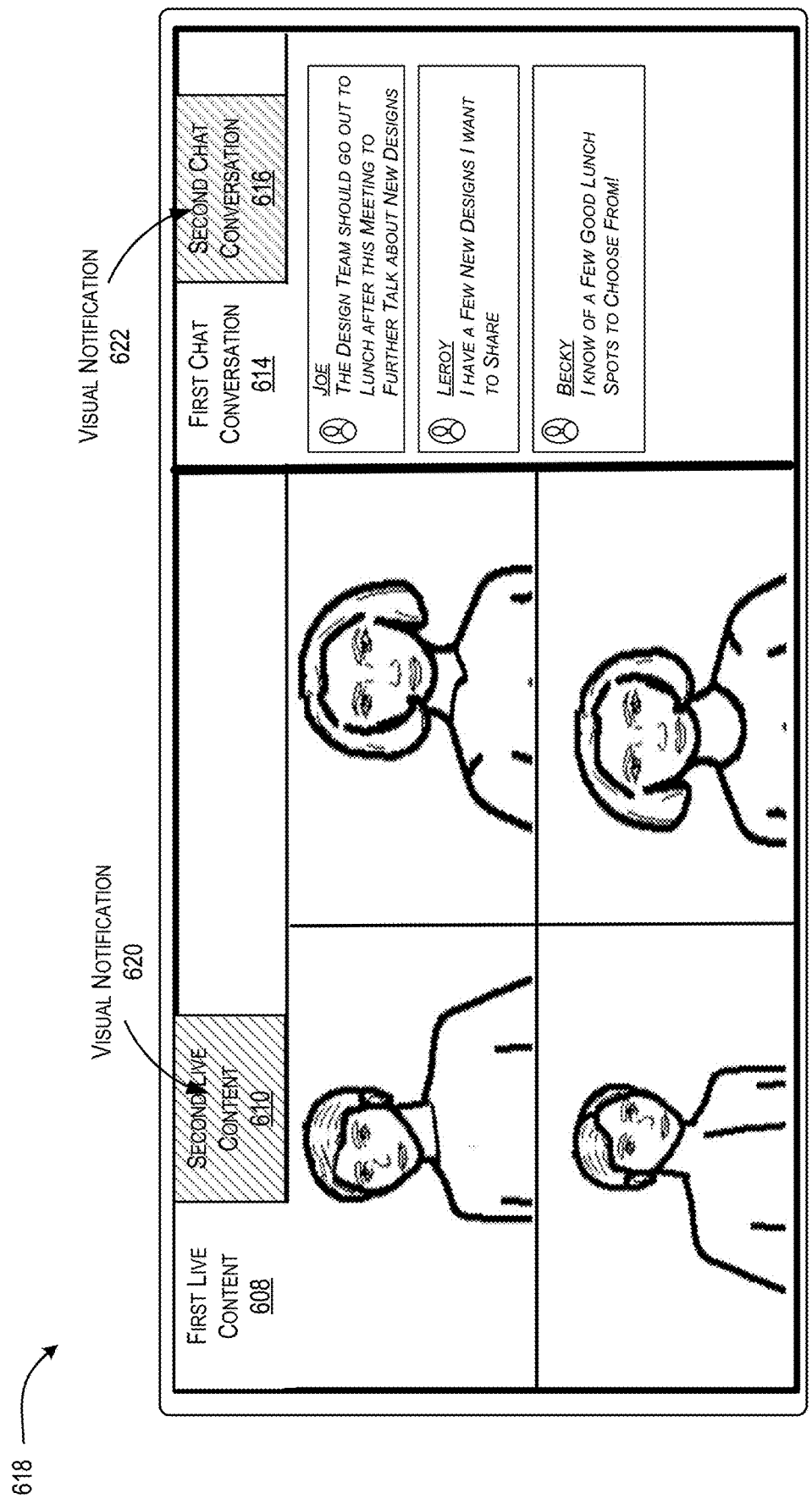
FIG. 6B illustrates a graphical user interface that shows how a user can stay engaged with a conference session while the user is viewing first live content and a chat conversation associated with another conference session (e.g., as shown in FIG. 6A).

FIG. 6B illustrates a graphical user interface 618 that shows how a user can stay engaged with the second conference session while the user is viewing the first live content and the first chat conversation associated with the first conference session (e.g., as shown in FIG. 6A). Accordingly, the live content and the chat conversations shown in FIG. 6B are the same as that shown in FIG. 6A.

Upon detection of a notable event that occurs in the second live content, the output module 132 can generate and communicate a visual notification 620 in association with the second live content. For instance, if concentrated activity occurs in the second live content while the user is viewing the first live content, then the output module 132 can cause the second tab 610 in the display area 606 to change colors, change patterns, flash, etc., to attract the user's attention. This amounts to the visual notification 620. Concentrated activity can occur, for example, if a threshold number of users (e.g., four, five, etc.) speak within a defined period of time (e.g., thirty seconds, one minute, etc.). In another example, concentrated activity can occur, for example, if a threshold number of edits are made to a file within a defined period of time.

Furthermore, upon detection of a notable event that occurs in a chat conversation, the output module 132 can generate and communicate a visual notification 622 in association with a chat conversation. For instance, if someone conducts a poll within the second chat conversation while the user is viewing the first chat conversation, then the output module 132 can cause the second tab 616 associated with the second chat conversation to change colors, change patterns, flash, etc., to attract the user's attention. Again, this amounts to the visual notification 622.

Consequently, via the use of the visual notifications 620 and 622 associated with non-selected or inactive tabs, a user can stay partially engaged with the second live content and/or the second chat conversation even though the second live content and/or the second chat conversation are not currently viewable. Moreover, the tabs provide efficient access to view the second live content and/or the second chat conversation.

Figure 7:
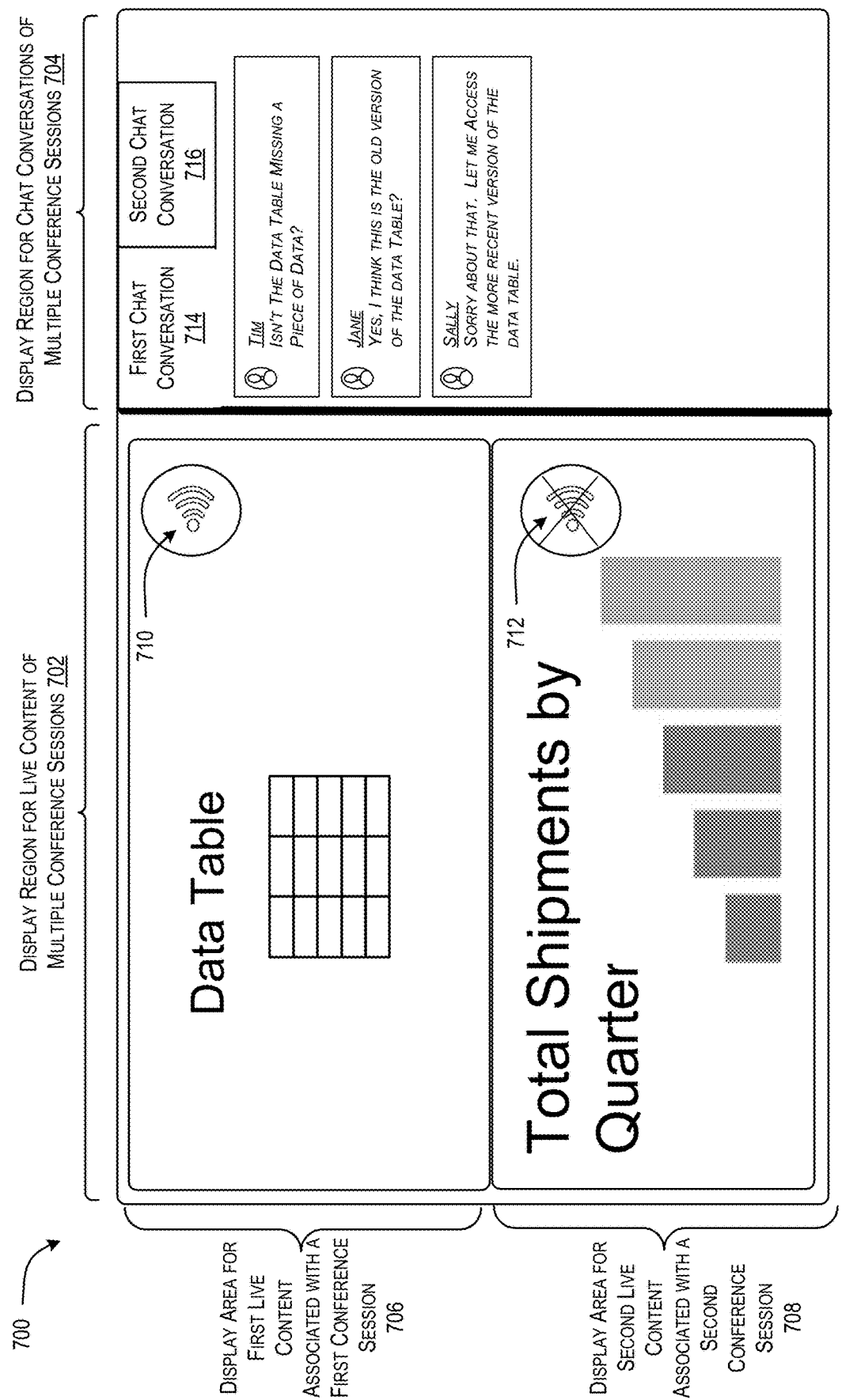
FIG. 7 illustrates another example graphical user interface configured to display live content of multiple conference sessions in an adjacent view and chat conversations of the multiple conference sessions in a tabbed view.

FIG. 7 illustrates another example graphical user interface 700 configured to display live content of multiple conference sessions in an adjacent view and chat conversations of the multiple conference sessions in a tabbed view. Again, the output module 132 can generate and cause a client computing device to render (e.g., via transmission of conference data and/or commands) the example graphical user interface 700 on a display screen, based on requests received from the client computing device.

Similar to FIG. 4A, the example graphical user interface 700 includes a display region 702 for live content of the multiple conference sessions, and an adjacent display region 704 for chat conversations of the multiple conference sessions. The display region 702 for live content of the multiple conference sessions includes a display area 706 for first live content associated with a first conference session, as well as a display area 708 for second live content associated with a second conference session. The display areas 706 and 708 are adjacent to one another so that a user viewing the example graphical user interface 700 can be concurrently engaged with both the first live content of the first conference session and the second live content of the second conference session. However, rather than a side-by-side adjacent view of the first live content and the second live content as shown in FIG. 4A, FIG. 7 illustrates a top-and-bottom adjacent view (e.g., the display area 706 is on top of the display area 708). In this example where a user is concurrently engaged with live content of two conference sessions, the display areas 706 and 708 split the display region 702 in a vertical direction.

Furthermore, since the user is more engaged with the first live content of the first conference session than the second live content of the second conference session, the example graphical user interface 700 illustrates an indicator 710 that the first live content displayed in the display area 706 has audio enabled to be output by the client computing device. In contrast, the example graphical user interface 700 illustrates another indicator 712 that the second live content displayed in the display area 708 has the audio disabled, and thus user communications cannot be audibly output by the client computing device. Similar to FIG. 5A, the indicators 710 and/or 712 can also be selectable control elements that enable the user to switch levels of engagement with the first and second live content.

The display region 704 for the chat conversations of the multiple conference sessions includes tabbed chat conversations associated with the first and second conference sessions. For instance, the display region 704 includes a first tab 714 for a first chat conversation associated with the first conference session and a second tab 716 for a second chat conversation associated with the second conference session.

FIG. 8A illustrates an example graphical user interface 800 configured to concurrently display live content of two conference sessions in a primary display area 802 and a secondary display area 804. Again, the output module 132 can generate and cause a client computing device to render (e.g., via transmission of conference data and/or commands) the example graphical user interface 800 on a display screen, based on requests received from the client computing device.

In this example, the primary display area 802 is the dominant display area and is larger than the secondary display area 804. Thus, the first live content displayed in the primary display area 802 is active and audio is enabled, as shown by the indicator 806. In contrast, the second live content displayed in the secondary display area 804 is inactive and audio is disabled, as shown by indicator 808. However, the user can visually monitor activity that occurs in the second live content via the secondary display area 804 to stay partially engaged even though audio is not enabled.

The graphical user interface 800 further illustrates an interactive timeline 810. The interactive timeline 810 can be associated with the first live content displayed in the primary display area 802, or the interactive timeline 810 can be associated with the second live content displayed in the secondary display area 804. In some instances, multiple interactive timelines can be displayed, one associated with each instance of live content displayed.

The interactive timeline 810 is populated with representations of notable events, and thus, the interactive timeline 810 includes different representations (e.g., the circles, squares, or other shapes) that correspond to different types of notable events. The interactive timeline 810 allows a user to preview notable events and activity that that previously occurred in the conference session and to locate notable events that may be of interest to the user. In various implementations, a representation can comprise and/or be associated with: an icon or a symbol indicative of a type of notable event, a user avatar, and/or initials of a user. The interactive timeline 810 enables a user to interact with representations while viewing the live content. An interactive timeline cursor 812 can represent a position, or a point, within a scheduled duration of the conference session.

In various examples, the interactive timeline 810 can comprise or be associated with a sequence of still images (e.g., thumbnail images) that captures activity of a view of the conference session at various positions or points in time. For instance, a thumbnail image associated with a video frame can be displayed in association with a representation (e.g., below the representation, above the representation, etc.). In some examples, the thumbnail image can be persistently displayed. Alternatively, the thumbnail image can be configured to come into view based on user interaction (e.g., hover input) with the interactive timeline 810 and/or a representation. Consequently, the user can scan the interactive timeline 810, the representations, and/or the sequence of images to locate previous activity that may be of interest.

For example, upon switching engagement levels and fully engaging with live content with which the user previously was partially engaged (e.g., the switch occurring in response to a visual notification), the user can use the interactive timeline to locate the notable event that may have been missed. Accordingly, an interactive timeline can be displayed in association with any instance of live content illustrated in individual ones of FIGS. 4A through FIG. 7. In some instances, the representation associated with the detected notable event that caused the visual notification can be graphically distinguished on an interactive timeline to attract the user's attention (e.g., flash, change colors, have an increased size, etc.).

In the example of FIG. 8A, the interactive timeline 810 is displayed at the bottom of the user interface 800 that is presented on a display screen (e.g., display screen 128). However, in alternative examples, an interactive timeline can be presented as an overlay on top of live content and/or the interactive timeline can be transparent.

Figure 8B:
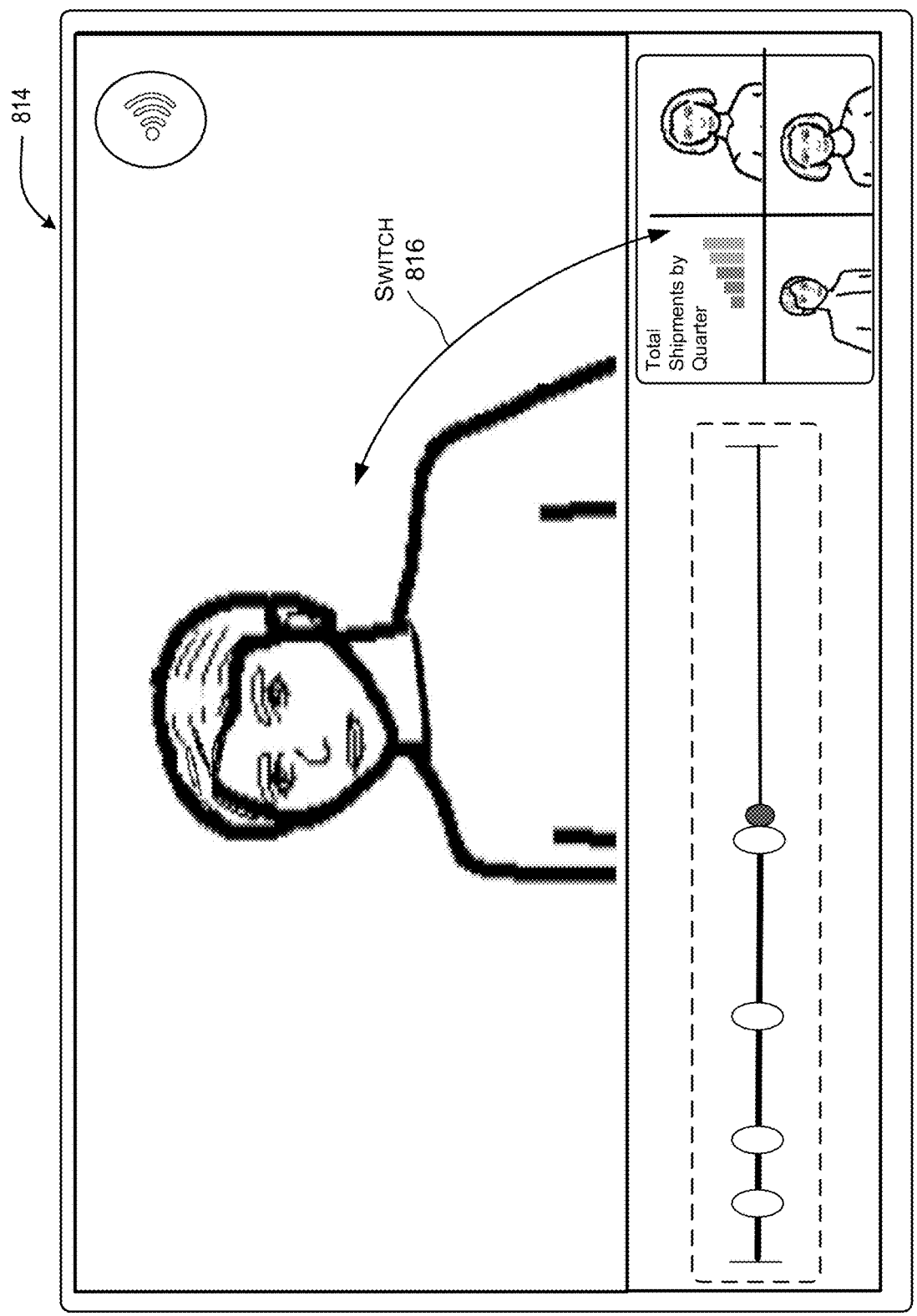
FIG. 8B illustrates an example graphical user interface configured to switch the display of the live content of two conference sessions between the primary display area and the secondary display area.

FIG. 8B illustrates an example graphical user interface 814 configured to switch the display of the live content of two conference sessions between the primary display area 802 and the secondary display area 804 illustrated in FIG. 8A. That is, the first live content displayed in the primary display area 802 in FIG. 8A has been switched 816 to the secondary display area 804 in FIG. 8B, and the second live content displayed in the secondary display area 804 in FIG. 8A has been switched 816 to the primary display area 802 in FIG. 8B. In some examples, the switch 816 can be implemented based on user input (e.g., selection of a switch control element or a click on the secondary display area 804). Consequently, live content can be toggled between the display areas so that the user can change the engagement levels with the first and second live content.

Figure 9:
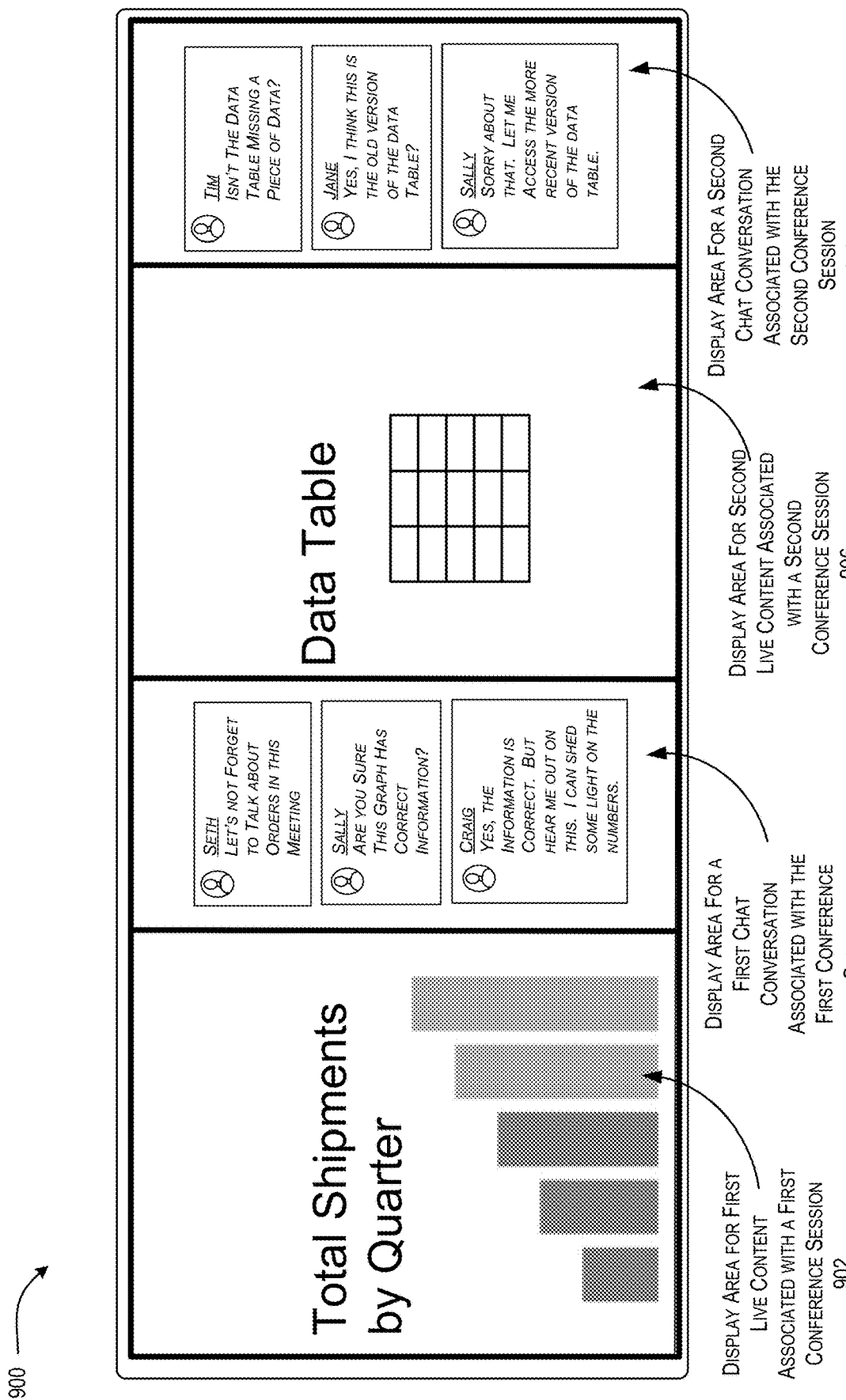
FIG. 9 illustrates an example graphical user interface configured to display both live content and chat conversations of multiple conference sessions in an alternate view.

FIG. 9 illustrates an example graphical user interface 900 configured to display both live content and chat conversations of multiple conference sessions in an alternate view. As shown, the display areas configured within the graphical user interface 900 can alternate so that both instances of live content can be displayed next to their corresponding chat conversations. That is, a display area 902 for first live content associated with a first conference session is next to a display area 904 for a first chat conversation associated with the first conference session. Moreover, a display area 906 for second live content associated with a second conference session is next to a display area 908 for a second chat conversation associated with the second conference session.

As illustrated, the example graphical user interfaces described herein enable different levels of engagement with multiple live conference sessions. The techniques described herein can be useful in different states where a user and a client computing device (i) is consuming the live content of multiple conference sessions or (ii) is presenting live content via a first conference session and is consuming live content via one or more additional conference sessions. Thus, in various examples, the view in which the live content of multiple conference sessions is displayed can depend on the state associated with the user and the client computing device.

Figure 10:
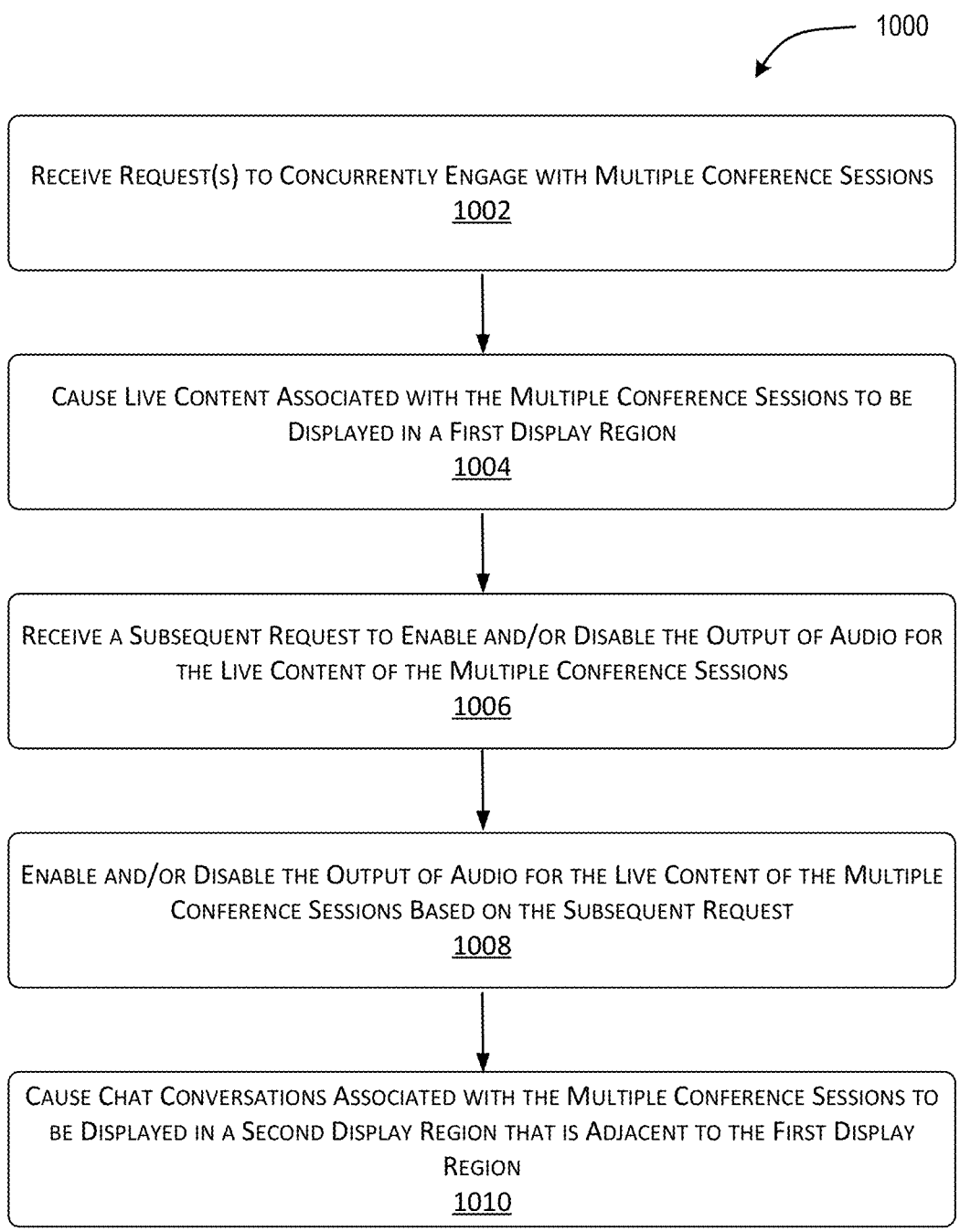
FIG. 10 is a diagram of an example flowchart that illustrates operations directed to configuring a graphical user interface so that a user can concurrently engage with multiple conference sessions (e.g., live content, chat conversations, etc.).
Figure 11:
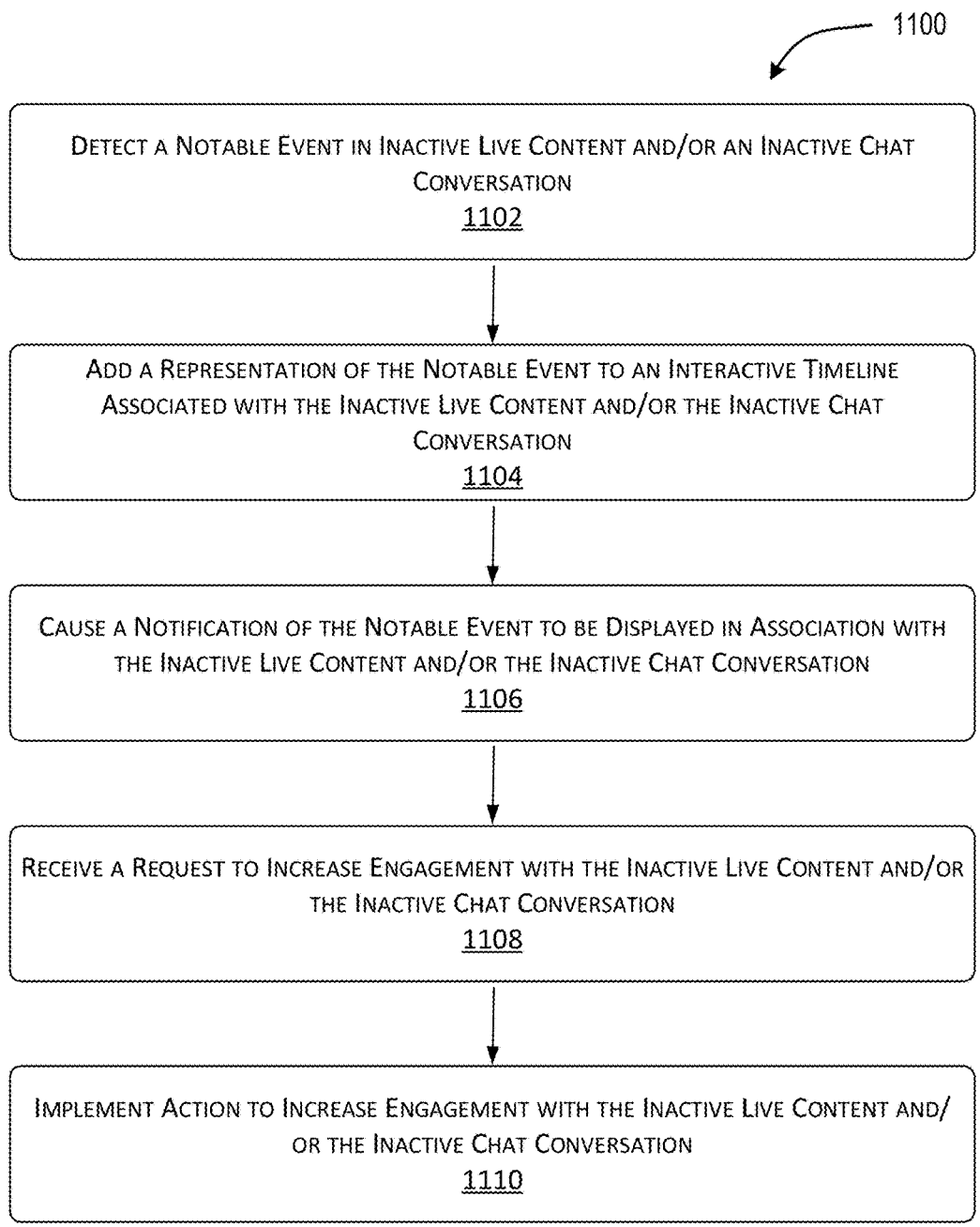
FIG. 11 is a diagram of an example flowchart that illustrates operations directed to generating and displaying a visual notification based on detection of a notable event.

FIGS. 10 and 11 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, client computing device 106(N), and/or device 300) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 10 and/or 11 can be implemented in association with the example graphical user interfaces described above with respect to FIGS. 4A-9. For instance, the various device(s) and/or module(s) in FIGS. 1-3 can generate, transmit, receive, and/or display data associated with a conference session (e.g., live content, a chat conversation, etc.) and/or an interactive timeline that includes representations of notable events that occur in association with the conference session.

FIG. 10 is a diagram of an example flowchart 1000 that illustrates operations directed to configuring a graphical user interface so that a user can concurrently engage with multiple conference sessions (e.g., live content, chat conversations, etc.). In one example, the operations of FIG. 10 can be performed by components of the system 102 and/or a client computing device 106(N).

At operation 1002, one or more requests to concurrently engage with multiple conference sessions are received. For example, a user of a client computing device 106(N) can join multiple conference sessions, as described above with respect to FIGS. 1 and 2.

At operation 1004, live content associated with the multiple conference sessions can be caused to be displayed in a first display region. As described above, in one example, the live content associated with the multiple conference sessions can be displayed in an adjacent view configuration (e.g., concurrent display of first live content and second live content). In another example, the live content associated with the multiple conference sessions can be displayed in a tabbed view configuration (e.g., alternate display of first live content and second live content based on selection of a tab). In some examples, a user can provide input that selects, as a preference, the adjacent view or the tabbed view.

At operation 1006, a subsequent request to enable and/or disable the output of audio for the first live content and/or the second live content. The subsequent request can be based on user selection of a control element to switch engagement levels (e.g., switch the audio output from one instance of live content to another instance of live content) and/or user selection of a tab.

At operation 1008, the output of audio for the first live content and/or the second live content is enabled and/or disabled based at least in part on the subsequent request.

At operation 1010, chat conversations associated with the multiple conference sessions can be caused to be displayed in a second display region. In one example, the chat conversations associated with the multiple conference sessions can be displayed in an adjacent view configuration (e.g., concurrent display of a first chat conversation and a second chat conversation). In another example, the chat conversations associated with the multiple conference sessions can be displayed in a tabbed view configuration (e.g., alternate display of a first chat conversation and a second chat conversation). In some examples, a user can provide input that selects, as a preference, the adjacent view or the tabbed view.

FIG. 11 is a diagram of an example flowchart 1100 that illustrates operations directed to generating and displaying a visual notification based on detection of a notable event. In one example, the operations of FIG. 11 can be performed by components of the system 102 and/or a client computing device 106(N).

At operation 1102, a notable event that occurs in inactive live content (e.g., live content that is displayed but for which audio is not enabled, live content that is not displayed due to an un-selected tab, etc.) and/or an inactive chat conversation is detected (e.g., a chat conversation that is not displayed due to an un-selected tab).

At operation 1104, a representation of the notable event is added to an interactive timeline associated with the inactive live content and/or the inactive chat conversation.

At operation 1106, a notification of the notable event is caused to be displayed in association with the inactive live content and/or the inactive chat conversation.

At operation 1108, a request to increase engagement with the inactive live content and/or the inactive chat conversation is received. For example, in response to seeing the notification, the user can select a control element and/or tab to enable audio for the inactive live content and/or to display the inactive live content. In another example, in response to seeing the notification, the user can select a tab to have the inactive chat conversation displayed.

At operation 1110, an action to implement increased engagement with the inactive live content and/or the inactive chat conversation is taken. As described above, the action can include one or more of enabling audio for the inactive live content, displaying the inactive live content, or displaying the inactive chat conversation. In some examples, the action can also include displaying the interactive timeline.

The disclosure presented herein may be considered in view of the following example clauses.

Example Clause A, a system comprising: one or more processing units; and a computer-readable medium having encoded thereon computer-executable instructions to cause the one or more processing units to: receive, from a client computing device, one or more requests to view first live content associated with a first conference session concurrently with second live content associated with a second conference session; cause the first live content associated with the first conference session to be displayed in a first display area of a first display region within a user interface; cause the second live content associated with the second conference session to be displayed in a second display area of the first display region within the user interface, the second display area being adjacent to the first display area in the first display region so that the first live content and the second live content are concurrently displayed; receive, from the client computing device, a subsequent request to enable output of first audio for the first live content; enable, based at least in part on the subsequent request, the output of the first audio for the first live content; based on the enabling of the output of the first audio for the first live content, disable output of second audio for the second live content; and cause a second display region within the user interface to be displayed, the second display region being adjacent to the first display region and the second display region configured to display at least one of a first chat conversation associated with the first live content or a second chat conversation associated with the second live content.

Example Clause B, the system of Example Clause A, wherein the second display region is configured to switch between displaying the first chat conversation and displaying the second chat conversation based at least in part on selection of a tab.

Example Clause C, the system of Example Clause A, wherein the second display region is configured to concurrently display the first chat conversation and the second chat conversation.

Example Clause D, the system of any one of Example Clauses A through C, wherein the computer-executable instructions further cause the one or more processing units to: detect an occurrence of a notable event in the second live content; and cause a notification to be displayed based on the occurrence of the notable event in the second live content.

Example Clause E, the system of Example Clause D, wherein the notable event comprises one or more of a mention of a user identity, a sharing of a file, a change to a file currently displayed, a task that is assigned, an explicit flag added to an interactive timeline by a user, or a time period of concentrated activity.

Example Clause F, the system of one of Example Clauses D or E, wherein the notification is graphically associated with the second display area of the first display region within the user interface.

Example Clause G, the system of any one of Example Clauses A through F, wherein the computer-executable instructions further cause the one or more processing units to cause a control element to be output, the control element, upon selection, enabling the output of the second audio for the second live content while disabling the output of the first audio for the first live content.

Example Clause H, the system of any one of Example Clauses A through G, wherein the computer-executable instructions further cause the one or more processing units to cause a status indicator to be communicated and displayed to participants of the second conference session indicating that the output of the second audio for the second live content has been disabled.

Example Clause I, the system of any one of Example Clauses A through H, wherein the first display area of the first display region and the second display area of the first display region are of equal size and split the first display region in one of a vertical or a horizontal direction.

Example Clause J, the system of any one of Example Clauses A through I, wherein the first live content and the second live content each comprise file data, the file data being associated with at least one of a document, a presentation, a spreadsheet, an image, or a video.

Example Clause K, the system of Example Clause J, wherein the computer-executable instructions further cause the one or more processing units to cause a monitor to be displayed, the monitor comprising one or more video streams associated with one or more persons participating in the first conference session, the output of the first audio including speech by individual ones of the one or more persons.

While Example Clauses A through K are described above with respect to a system, it is also understood that the subject matter of Example Clauses A through K can be implemented as a method, by a device, and/or via computer readable storage media.

Example Clause L, a method comprising: receiving, from a client computing device, one or more requests to view first live content associated with a first conference session concurrently with second live content associated with a second conference session; causing the first live content associated with the first conference session to be displayed in a first display area within a user interface; causing the second live content associated with the second conference session to be displayed in a second display area within the user interface, the second display area being adjacent to the first display area so that the first live content and the second live content are concurrently displayed; receiving, from the client computing device, a subsequent request to enable output of first audio for the first live content; enabling, based at least in part on the subsequent request, the output of the first audio for the first live content; based on the enabling of the output of the first audio for the first live content, disabling output of second audio for the second live content; detecting an occurrence of a notable event in the second live content; causing a notification to be displayed based on the occurrence of the notable event in the second live content; and causing a control to be displayed within the user interface, the control, upon selection, enabling the output of the second audio for the second live content while disabling the output of the first audio for the first live content.

Example Clause M, the method of Example Clause L, further comprising causing a third display area within the user interface to be displayed, the third display area configured to display at least one of a first chat conversation associated with the first live content or a second chat conversation associated with the second live content.

Example Clause N, the method of one of Example Clauses L or M, wherein the notable event comprises one or more of a mention of a user identity, a sharing of a file, a change to a file currently displayed, a task that is assigned, an explicit flag added to an interactive timeline, or a time period of concentrated activity.

Example Clause O, the method of any one of Example Clauses L through N, further comprising causing a status indicator to be displayed to participants of the second conference session indicating that the output of the second audio for the second live content has been disabled.

While Example Clauses L through O are described above with respect to a method, it is also understood that the subject matter of Example Clauses A through K can be implemented by a system or a device and/or via computer readable storage media.

Example Clause P, a system comprising: one or more processing units; and a computer-readable medium having encoded thereon computer-executable instructions to cause the one or more processing units to: receive, from a client computing device, one or more requests to concurrently engage with a first conference session and a second conference session; cause a first display region to be displayed within a user interface, the first display region configured to display, based on selection of a first tab, first live content associated with the first conference session or second live content associated with the second conference session; and cause a second display region to be displayed within the user interface adjacent to the first display region, the second display region configured to display, based on selection of a second tab, a first chat conversation associated with the first conference session or a second chat conversation associated with the second conference session.

Example Clause Q, the system of Example Clause P, wherein the first live content associated with the first conference session is displayed based on the selection of the first tab and the computer-executable instructions further cause the one or more processing units to: detect an occurrence of a notable event in the second live content; and cause a notification to be displayed based on the occurrence of the notable event in the second live content.

Example Clause R, the system of Example Clause Q, wherein the computer-executable instructions to cause the one or more processing units to: add a representation of the notable event to an interactive timeline associated with the second live content; receive, based on user selection of the third tab, a request to switch from displaying the first live content in the first display region to displaying the second live content in the first display region; and cause the interactive timeline to be displayed in association with the second live content in the first display region.

Example Clause S, the system of any one of Example Clauses P through R, wherein the first chat conversation associated with the first conference session is displayed based on the selection of the second tab and the computer-executable instructions further cause the one or more processing units to: detect an occurrence of a notable event in the second chat conversation; and cause a notification to be displayed based on the occurrence of the notable event in the second chat conversation.

Example Clause T, the system of Example Clause S, wherein the notable event comprises one or more of a mention of a user identity, a sharing of a file, a task that is assigned, or a poll that is conducted.

While Example Clauses P through T are described above with respect to a system, it is also understood that the subject matter of Example Clauses P through T can be implemented as a method, by a device, and/or via computer readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processing units; and
   a computer-readable medium having encoded thereon computer-executable instructions to cause the one or more processing units to:
   receive, from a client computing device, one or more requests to view first live content associated with a first conference session concurrently with second live content associated with a second conference session;
   cause the first live content associated with the first conference session to be displayed in a first display area of a first display region within a user interface;

cause the second live content associated with the second conference session to be displayed in a second display area of the first display region within the user interface, the second display area being adjacent to the first display area in the first display region so that the first live content and the second live content are concurrently displayed;

receive, from the client computing device, a subsequent request to enable output of first audio for the first live content;

enable, based at least in part on the subsequent request, the output of the first audio for the first live content;

based on the enabling of the output of the first audio for the first live content, disable output of the second audio for the second live content;

cause a second display region within the user interface to be displayed, the second display region being adjacent to the first display region and configured to display at least one of a first textual chat conversation associated with the first live content or a second textual chat conversation associated with the second live content; and cause a third display region within the user interface to be displayed, the third display region configured to display at least one of a first textual chat conversation associated with the first live content or a second textual chat conversation associated with the second live content, the third display region displayed concurrently with at least one of the first and second display regions.

2. The system of claim 1, wherein the second display region is configured to switch between displaying the first textual chat conversation and displaying the second textual chat conversation based at least in part on selection of a tab.

3. The system of claim 1, wherein the second display region is configured to concurrently display the first textual chat conversation and the second textual chat conversation.

4. The system of claim 1, wherein the computer-executable instructions further cause the one or more processing units to:
detect an occurrence of a notable event in the second live content; and
cause a notification to be displayed based on the occurrence of the notable event in the second live content.

5. The system of claim 4, wherein the notable event comprises one or more of a mention of a user identity, a sharing of a file, a change to a file currently displayed, a task that is assigned, an explicit flag added to an interactive timeline by a user, or a time period of concentrated activity.

6. The system of claim 4, wherein the notification is graphically associated with the second display area of the first display region within the user interface.

7. The system of claim 1, wherein the computer-executable instructions further cause the one or more processing units to cause a control element to be output, the control element, upon selection, enabling the output of the second audio for the second live content while disabling the output of the first audio for the first live content.

8. The system of claim 1, wherein the computer-executable instructions further cause the one or more processing units to cause a status indicator to be communicated and displayed to participants of the second conference session indicating that the output of the second audio for the second live content has been disabled.

9. The system of claim 1, wherein the first display area of the first display region and the second display area of the first display region are of equal size.

10. The system of claim 1, wherein the first live content and the second live content each comprise file data, the file data being associated with at least one of a document, a presentation, a spreadsheet, an image, or a video.

11. The system of claim 10, wherein the computer-executable instructions further cause the one or more processing units to cause a monitor to be displayed, the monitor comprising one or more video streams associated with one or more persons participating in the first conference session, the output of the first audio including speech by individual ones of the one or more persons.

12. A method comprising:
receiving, from a client computing device, one or more requests to view first live content associated with a first conference session concurrently with second live content associated with a second conference session;
causing the first live content associated with the first conference session to be displayed in a first display area within a user interface;
causing the second live content associated with the second conference session to be displayed in a second display area within the user interface, the second display area being adjacent to the first display area so that the first live content and the second live content are concurrently displayed;
receiving, from the client computing device, a subsequent request to enable output of first audio for the first live content;
enabling, based at least in part on the subsequent request, the output of the first audio for the first live content;
based on the enabling of the output of the first audio for the first live content, disabling output of the second audio for the second live content;
detecting an occurrence of a notable event in the second live content;
causing a notification to be displayed based on the occurrence of the notable event in the second live content;
causing a control to be displayed within the user interface, the control, upon selection, enabling the output of the second audio for the second live content while disabling the output of the first audio for the first live content; and
causing a third display area within the user interface to be displayed, the third display area configured to display at least one of a first textual chat conversation associated with the first live content or a second textual chat conversation associated with the second live content, the third display area displayed concurrently with the first and second display areas.

13. The method of claim 12, wherein the notable event comprises one or more of a mention of a user identity, a sharing of a file, a change to a file currently displayed, a task that is assigned, an explicit flag added to an interactive timeline, or a time period of concentrated activity.

14. The method of claim 12, further comprising causing a status indicator to be displayed to participants of the second conference session indicating that the output of the second audio for the second live content has been disabled.

15. A system comprising:
one or more processing units; and
a computer-readable medium having encoded thereon computer-executable instructions to cause the one or more processing units to:
receive, from a client computing device, one or more requests to concurrently engage with a first conference session and a second conference session;

cause a first display region to be displayed within a user interface, the first display region configured to display, based on selection of a first tab, first live content associated with the first conference session or second live content associated with the second conference session;

cause a second display region to be displayed within the user interface adjacent to the first display region, the second display region configured to display, based on selection of a second tab, a first textual chat conversation associated with the first conference session or a second textual chat conversation associated with the second conference session; and cause a third display region within the user interface to be displayed, the third display region configured to display at least one of the first textual chat conversation or the second textual chat conversation, the third display region displayed concurrently with at least one of the first and second display regions.

16. The system of claim 15, wherein the first live content associated with the first conference session is displayed based on the selection of the first tab and the computer-executable instructions further cause the one or more processing units to:

detect an occurrence of a notable event in the second live content; and cause a notification to be displayed based on the occurrence of the notable event in the second live content.

17. The system of claim 16, wherein the computer-executable instructions cause the one or more processing units to:

add a representation of the notable event to an interactive timeline associated with the second live content;

receive, based on user selection of the third tab, a request to switch from displaying the first live content in the first display region to displaying the second live content in the first display region; and cause the interactive timeline to be displayed in association with the second live content in the first display region.

18. The system of claim 15, wherein the first textual chat conversation associated with the first conference session is displayed based on the selection of the second tab and the computer-executable instructions further cause the one or more processing units to:

detect an occurrence of a notable event in the second textual chat conversation; and cause a notification to be displayed based on the occurrence of the notable event in the second textual chat conversation.

19. The system of claim 18, wherein the notable event comprises one or more of a mention of a user identity, a sharing of a file, a task that is assigned, or a poll that is conducted.

* * * * *